(12) United States Patent
Kim

(10) Patent No.: US 11,786,435 B2
(45) Date of Patent: Oct. 17, 2023

(54) GAIT ASSISTIVE DEVICE AND WALKING ROBOT HAVING THE SAME

(71) Applicant: Il Soo Kim, Yongin-si (KR)

(72) Inventor: Il Soo Kim, Yongin-si (KR)

( * ) Notice: Subject to any disclaimer, the term of this patent is extended or adjusted under 35 U.S.C. 154(b) by 577 days.

(21) Appl. No.: 16/843,995

(22) Filed: Apr. 9, 2020

(65) Prior Publication Data
US 2020/0230014 A1 Jul. 23, 2020

Related U.S. Application Data

(63) Continuation of application No. PCT/KR2018/011993, filed on Oct. 11, 2018.

(30) Foreign Application Priority Data

Oct. 11, 2017 (KR) .......................... 10-2017-0129752

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *A61H 2201/1238* (2013.01);
(Continued)

(58) Field of Classification Search
CPC ...... A61H 1/0262; A61H 1/0266; A61H 3/00; A61H 2205/12; A61H 2230/62; A61H 2203/0406; B25J 9/0006; A43B 13/141; A43B 13/1432; A43B 13/14; A43B 21/42; A43B 21/433; A43B 21/52; A43C 15/09; A62H 2201/1676; A62H 2201/1238; A62H 2201/165; A62H 2201/164; A62H 2201/1253; A62H 2201/0165;
(Continued)

(56) References Cited

U.S. PATENT DOCUMENTS 1,613,538 A * 1/1927 Schad .................. A43B 13/184
36/7.8
2,470,480 A 5/1949 Fogg
(Continued)

FOREIGN PATENT DOCUMENTS

| CN | 101584514 | 11/2009 |
|---|---|---|
| CN | 101835446 | 9/2010 |

(Continued)

OTHER PUBLICATIONS

EPO, Search Report of EP 18865774.6 dated Sep. 29, 2021.

*Primary Examiner* — Samchuan C Yao
*Assistant Examiner* — Savannah L Gabriel
(74) *Attorney, Agent, or Firm* — LEX IP MEISTER, PLLC

(57) ABSTRACT

A gait assistive device that may be used to improve a gait disability by replacing or compensating movement of joints of an ankle and a foot that occur during a gait or that may be used for a bottom structure of a gait robot is disclosed. The present invention provides a gait assistive device including: a foot supporting part; a rear connecting part coupled to a heel portion of the foot supporting part; and a rearfoot plate coupled to the rear connecting part, wherein the rear connecting part may include a joint, and a shaft of the joint is installed on a line or rear line of a load line at heel strike during a gait cycle based on a direction of a gait.

8 Claims, 43 Drawing Sheets

(52) U.S. Cl.
CPC .............. *A61H 2201/1253* (2013.01); *A61H 2201/165* (2013.01); *A61H 2205/12* (2013.01)

(58) Field of Classification Search
CPC .... A62H 2201/1284; A62H 2201/5051; A62H 2201/5056; A61F 5/0127; A63B 23/10
See application file for complete search history.

(56) References Cited

U.S. PATENT DOCUMENTS

| | | | |
|---|---|---|---|
| 4,573,678 | A | 3/1986 | Porte, Jr. |
| 5,405,411 | A | 4/1995 | McCoy |
| 8,136,265 | B2 | 3/2012 | Lee |
| 2004/0040180 | A1 | 3/2004 | Rennex |
| 2005/0005472 | A1 | 1/2005 | Perenich |
| 2005/0166422 | A1* | 8/2005 | Schaeffer ............. A43B 13/141 36/27 |
| 2009/0282697 | A1* | 11/2009 | Lee ....................... A43B 21/30 36/27 |
| 2010/0248921 | A1 | 9/2010 | Shinomiya et al. |
| 2017/0055633 | A1* | 3/2017 | Hsu ...................... A43B 13/184 |
| 2018/0160946 | A1* | 6/2018 | Macko ................. A61B 5/4528 |

FOREIGN PATENT DOCUMENTS

| | | |
|---|---|---|
| CN | 102556199 | 7/2012 |
| CN | 102657409 | 9/2012 |
| JP | 2006-311932 | 11/2006 |
| JP | 2009-279402 | 12/2009 |
| JP | 2012-143365 | 8/2012 |
| KR | 10-2003-0072277 | 9/2003 |
| KR | 10-2009-0120071 | 11/2009 |
| KR | 10-2010-0134867 | 12/2010 |
| KR | 10-2011-0095549 | 8/2011 |
| KR | 10-2012-0047401 | 5/2012 |
| KR | 1020130100942 | 9/2013 |
| KR | 10-1425124 | 8/2014 |
| KR | 101531203 | 6/2015 |
| KR | 1020150113668 | 10/2015 |
| KR | 10-2016-0043245 | 4/2016 |
| KR | 1020160038244 | 4/2016 |
| KR | 101708571 | 2/2017 |
| WO | WO-2008018713 A1 * | 2/2008 ........... A43B 13/145 |
| WO | 2012/057452 | 5/2012 |

\* cited by examiner (a)

(b)

GAIT ASSISTIVE DEVICE AND WALKING ROBOT HAVING THE SAME

CROSS-REFERENCE TO RELATED APPLICATION

This application claims priority to and the benefit of Korean Patent Application No. 10-2017-0129752 filed in the Korean Intellectual Property Office on Oct. 11, 2017, and Korean Patent Application No. 10-2018-0121293 filed in the Korean Intellectual Property Office on Oct. 11, 2018, the entire contents of which are incorporated herein by reference.

BACKGROUND OF THE INVENTION

(a) Field of the Invention

The present invention relates to a gait assistive device and walking robot having the same, and more particularly, to a gait assistive device and walking robot having the same that may be used to improve a gait disability by replacing or compensating a movement of joints of an ankle and a foot that occur during a gait or that may be used for a bottom structure of a gait robot.

(b) Description of the Related Art

A gait is a movement that moves a human body in a desired direction while maintaining a stable weight load posture with respect to the ground, and thus force applied to the ground by a human body and ground reaction force GRF, which is a force of reaction to the force applied to the ground by the human body, are generated.

A normal gait is a very efficient movement that uses both active movement by muscle contraction and passive movement of joints of an ankle and a foot by the GRF.

When joint movement is limited by a splint or a cast due to a fracture of a lower limb, a ligament injury, or the like, or when joint movement should be limited by Charcot foot, ankle and foot arthropathies, or the like, since sufficient movements of joints of ankle and foot do not occur during the gait, a normal gait pattern is not achieved. Since ordinary shoes, cast shoes, rocker bottom shoes, and a conventional assistive device that are worn in this case do not take into account ground reaction force occurring during the gait, they do not achieve an efficient gait, and rather they may also adversely affect the gait due to a modified ground reaction force.

Even in gait disorders caused by central nervous system diseases such as a stroke, a brain injury, a brain tumor, and a cerebral palsy, a normal gait is impossible because muscle weakness and muscle stiffness do not allow normal movements of joints of the ankle and foot. An ankle foot orthosis (AFO), which is typically used in the related art, restricts joint movement of the ankle and the foot, and thus an efficient gait using the ground reaction force is absolutely impossible.

In addition, since gait robots that have been developed to date do not use the ground reaction force as efficiently as a human gait, a large number of driving devices outputting great force are required, and thus control and battery devices are also getting bigger, and further, weight and volume, as well as manufacturing costs, are increased.

SUMMARY OF THE INVENTION

Therefore, the present invention has been proposed to solve the above problems, and an object of the present invention is to provide a gait assistive device for achieving an efficient gait by using ground reaction force GRF.

Another object of the present invention is to provide a gait assistive device that compensates for movement of joints of an ankle and a foot when the movement of the joints of the ankle and the foot is limited or must be limited.

Another object of the present invention is to provide a gait assistive device that can help a patient with a gait disorder caused by nervous system damage achieve a stable gait by utilizing ground reaction force GRF.

In addition, another object of the present invention is to provide a walking robot that may be used in a bottom structure of a gait robot to reduce weights of a driving device, a control device, and a battery device.

The present invention provides a gait assistive device including: a foot supporting part; a rear connecting part coupled to a heel portion of the foot supporting part; and a rearfoot plate coupled to the rear connecting part, wherein the rear connecting part may include a joint, and the joint is disposed on or behind a load line at a first half of stance phase during a gait cycle with respect to the direction of walking.

An angle maintaining portion that adjusts a load applied along the load line at the first half of stance phase or maintains the rearfoot plate at a constant angle after heel off or during a swing phase of the gait cycle may be provided between the foot supporting part and the rearfoot plate.

The foot supporting part may be coupled to a rear moving member moving in a longitudinal direction of the foot supporting part, a position of the rear moving member may be adjusted by a rear adjusting member, and the rear connecting part may be coupled to the rear moving member.

The foot supporting part may be coupled to a front supporting part at a front side of the foot.

A front connecting part may be coupled to a front side of the foot supporting part, and a forefoot plate may be coupled to the front connecting part.

The foot supporting part may be coupled to a front moving member moving in the shaft direction, a position of the front moving member may be adjusted by a front adjusting member, and the front connecting part may be coupled to the front moving member.

The forefoot plate and the forefoot plate may be coupled to a plate connecting part that transmits interlocking movement therebetween.

A coronal adjusting part that transversely adjusts the forefoot plate may be installed between the forefoot plate and the foot supporting part.

A coronal adjusting part that transversely adjusts the rearfoot plate may be installed between the rearfoot plate and the foot supporting part.

A load adjusting part that adjusts the load applied along the load line at a first half of stance phase may be installed between the foot supporting part and the rearfoot plate.

The joint may have a structure that allows the rearfoot plate to move in a coronal or sagittal plane, or simultaneously allows the rearfoot plate to move in the coronal and sagittal planes.

The coronal adjusting part may be made of at least one of an elastic member, a torsion spring, and a chamber provided with a space accommodating a fluid, and the chamber may be connected to a flow adjusting valve that adjusts an amount of the fluid of the chamber.

Further, another embodiment of the present invention provides a gait assistive device including: a foot supporting part; a rear connecting part coupled to a heel portion of the foot supporting part; a rearfoot plate coupled to the rear connecting part; a front connecting part coupled to a front side of the foot supporting part; and a forefoot plate coupled to the front connecting part, wherein the front connecting part may include a joint, and the joint may be installed between a load line formed at a heel off and a load line formed at a toe off, during a gait cycle based on a gait proceeding direction.

Another embodiment of the present invention provides a walking robot, including: a foot supporting part; a rear connecting part coupled to a heel portion of the foot supporting part; and a rearfoot plate coupled to the rear connecting part, wherein the rear connecting part may include a joint, and the joint may be installed on or behind a load line at a first half of stance phase during a gait cycle with respect to the direction of walking.

The present invention has an effect of naturally achieving a gait of a patient without causing passive movements of joints of ankle and foot.

The present invention has a convenient effect of being used in real life by securing weight-lighting and wearability and functionality through a form of boots that may be worn in clothes (for example, pants) for a patient with a central nervous system disease in which the strength of hip muscles is maintained to some extent.

The present invention has an effect of increasing patient application by being configured of a structure that may be generally used.

The present invention has an effect of increasing stability of a gait of a walking robot by being applied to a bottom structure of the walking robot.

DETAILED DESCRIPTION OF THE EMBODIMENTS

Figure 1:
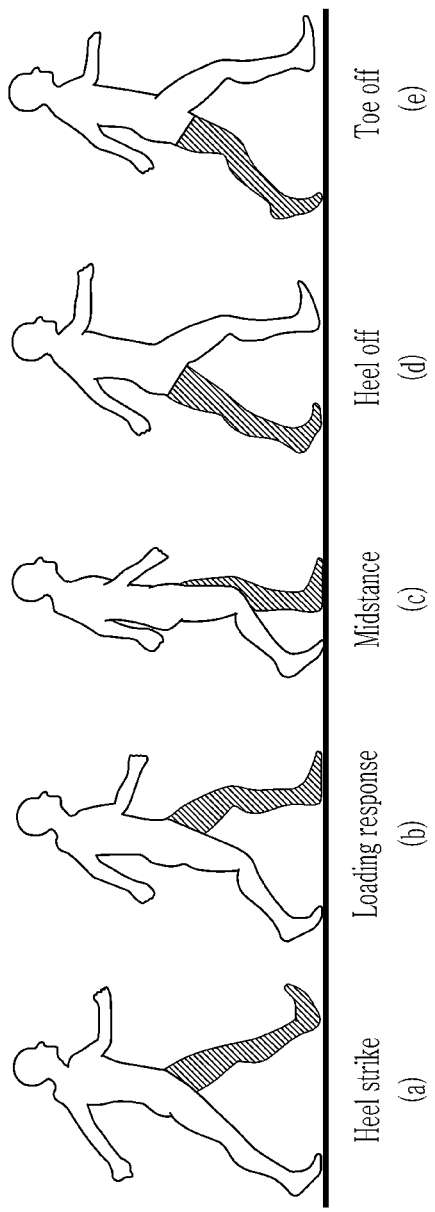
FIG. 1 illustrates a stance phase divided into five stages for explaining a general human gait cycle.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

In the present specification, unless explicitly described to the contrary, the word "comprise" and variations such as "comprises" or "comprising" will be understood to imply the inclusion of stated elements but not the exclusion of any other elements.

Hereinafter, a body center direction is referred to as an "inner side", a direction opposite to the "inner side" is referred to as an "outer side", a toe direction is referred to as a "forward side", and a heel direction is referred to as a "rear side". In addition, a "length direction" means a direction connecting a toe from a heel, and a "width direction" means a direction perpendicular to the length direction as a width of a foot.

An open kinetic chain (OKC) and a closed kinetic chain (CKC) as terms used in the detailed description of the present invention are defined as follows.

The closed kinetic chains (CKC) is a state in which a force is applied to a fixed object such as the ground and a wall by the movement of a human body, such as in activities such as gait or push-up. In this case, when the human body applies force to the fixed object, reaction force occurs simultaneously from the fixed object, and thus the reaction force from the fixed object also affects the movement of the human body.

On the contrary, the open kinetic chain (OKC) is a state in which the human body applies force on the unfixed object, such as in activities such as bench press and leg curl, and the object is freely moved by the movement of the human body. Therefore, reaction force that affects the movement of the human body does not occur.

In addition, in the description of the embodiment of the present invention, body load force (BLF) is force applied to the ground by the human body through a foot contacting the ground in the closed kinetic chain movement such as gait, and a load line (LL) is a line indicating a direction in which body load force is applied. Ground reaction force GRF is a reaction force to the body load force, which is opposite to a force of the same magnitude as the body load force. A direction of the load line depends on a position of a point in contact with the ground, and also depends on a contact shape, for example, point contact or plane contact.

In the description of the present invention, an external moment is defined as a rotational force generated in each joint by the ground reaction force GRF, and an internal moment is defined as a rotational force generated in each joint by muscle contraction.

A human gait cycle is as follows.

In FIG. 1, (a) to (e) are schematic views for explaining a human gait cycle.

The human gait cycle is divided into a stance phase and a swing phase based on one foot (hatched portions in the drawing).

The stance phase is a state in which the foot contacts the ground while walking. The stance phase includes heel strike (FIG. 1 (a)), loading response (FIG. 1 (b)), midstance (FIG. 1 (c)), heel off (FIG. 1 (d)), and toe off (FIG. 1 (e)).

The heel strike means a moment when the outside of the heel contacts the ground during the stance phase. At this time, plantar flexion of an ankle joint occurs by the ground reaction force GRF and pronation and eversion are generated in the subtalar joint, by the ground reaction force GRF, so that an impact against the ground may be absorbed (as shown in FIG. 1 (a))

The loading reaction is a process in which, while the entire sole contacts the ground after the heel strike, constant pronation occurs to absorb the impact applied to the foot and to disperse the body weight to adapt the foot to uneven ground (as shown in FIG. 1 (b)).

The midstance is a stage where the body weight is maximally loaded on the foot (as shown in FIG. 1 (c)).

The heel off is a stage where the heel of the foot is lifted up (as shown in FIG. 1 (d)).

The toe off is a stage where the toe of the foot is lifted up (as shown in FIG. 1 (e)).

On the other hand, the swing phase means a state in which the foot is away from the ground.

The gait is realized by repeatedly performing the stance phase and the swing phase.

Figure 2:
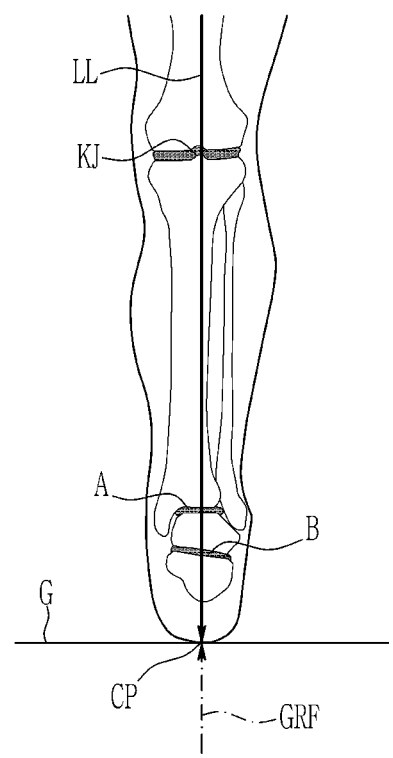
FIG. 2 illustrates articular surfaces positioned along a longitudinal axis of a lower limb skeleton of a human.

FIG. 2 illustrates articular surfaces positioned along a longitudinal axis of a lower limb skeleton of a human. In the standing posture, the load line LL passes through the knee joint KJ, ankle joint A, and subtalar joint B along the longitudinal axis of the lower limb skeleton. When a weight is loaded at a fixed object such as the ground, the load line LL passes through a point of contact with the ground along the longitudinal axis of the leg skeleton, and the ground reaction force GRF of the same magnitude is generated in an opposite direction thereto due to reaction thereto.

That is, the load line LL is a line indicating a direction of the body load force applied to the ground by the human body, and is directed to a point CP contacting the ground along the longitudinal axis of the lower limb at a moment of heel strike.

Figure 3:
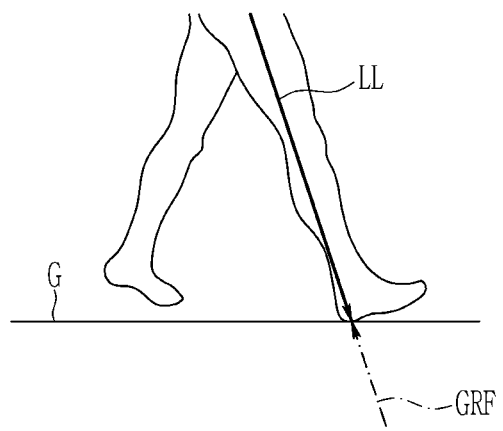
FIG. 3 illustrates a schematic view for explaining a load line of a human body and ground reaction force GRF at a moment of heel strike during a general gait cycle.

FIG. 3 illustrates a schematic view for explaining a load line of a human body and ground reaction force GRF at a moment of heel strike during a general gait cycle. The load line LL is directed to a portion at which the heel of the foot contacts the ground G along an axis of a leg, and the ground reaction force GRF occurs in an opposite direction thereof.

Figure 4:
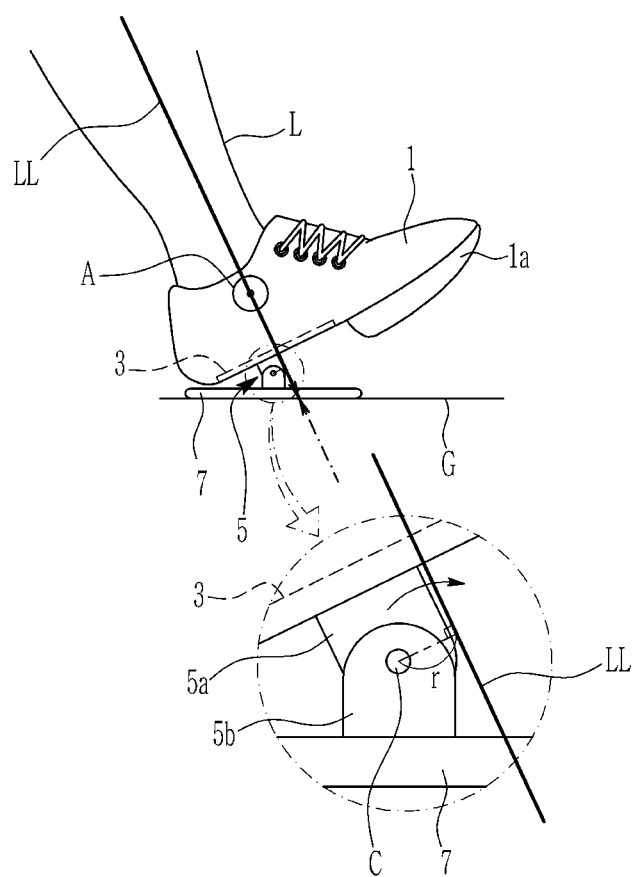
FIG. 4 illustrates a gait assistive device in which a load line and ground reaction force GRF are shown in a heel strike state during a gait cycle for explaining a first embodiment of the present invention.

FIG. 4 is a schematic view for explaining a first embodiment of the present invention, and illustrates a gait assistance device. The gait assistive device of the first embodiment of the present invention includes a foot fixing part 1, a foot supporting part 3, a rear connecting part 5, and a rearfoot plate.

The foot fixing part 1 may be worn by a patient like ordinary shoes or cast shoes, and a forefoot supporting part 1a having a predetermined height may be coupled to a bottom of a front side thereof.

The forefoot supporting part 1a may be formed of an elastic body having a predetermined elastic force or cushion, and may extend from a toe of the foot fixing part 1 to a middle portion of a sole of the foot. The forefoot supporting part 1a may be integrally molded with the foot fixing part 1 when applied to cast shoes. The forefoot supporting part 1a may be formed to have a shoe sole structure.

The foot supporting part 3 may be formed to have a shape of a plate.

The foot supporting part 3 may be integrally fixed to a bottom of the foot fixing part 1. When the foot supporting part 3 is separated from the foot fixing part 1, the foot supporting part 3 can be easily combined with existing shoes or cast shoes by using a coupling member such as a Velcro fastener.

In the description of the embodiment of the present invention, for convenience, the foot fixing part 1 and the foot supporting part 3 are separately described, but the foot fixing part 1 itself may be integrally formed to serve as the foot supporting part 3. Therefore, in the description of the embodiment of the present invention, the foot supporting part 3 may include the foot fixing part 1. That is, the rear connecting part 5 may be coupled to the foot supporting part 3, or may be directly coupled to the foot fixing portion 1.

Meanwhile, when the foot supporting part 3 is made long in a sole length direction, the forefoot supporting part 1a may be coupled to a front side of the foot supporting part 3.

Hereinafter, in the embodiment of the present invention, for convenience of description, an example in which the rear connecting part 5 is coupled to the foot supporting part 3 will be described.

The rear connecting part 5 connects the foot supporting part 3 and the rearfoot plate 7 at a heel portion of the foot fixing portion 1. The rear connecting part 5 includes a joint structure.

As an example of the joint structure, the rear connecting part 5 includes a first member 5a fixed to the foot supporting part 3, a second member 5b coupled to the rearfoot plate 7, and a hinge member C for hinge-coupling the first member 5a and the second member 5b.

The hinge member C may connect the first member 5a and the second member 5b so that a width direction of the foot forms a central axis. In the embodiment of the present invention, a rotating axis of the hinge member C means a rotating axis of the joint or a axis of the joint. Therefore, in the rearfoot plate 7, an inclination (also referred to as a pitch, and which means an inclinatioin in the sagittal plane) of the longitudinal direction of the foot may be adjusted. That is, the rearfoot plate 7 may have a pitch of a horizontal or arbitrary angle when viewed from the side of the foot with respect to the horizontal ground G.

The rearfoot plate 7 is coupled to the second member 5b of the rear connecting part 5. The rearfoot plate 7 is preferably made of a flat plate so as to be in plane contact with the ground surface G in the heel strike step during the gait cycle. The rearfoot plate 7 may be made of an elastic body having a sufficient size to cover the heel portion and having an elastic force. As such, the rearfoot plate 7 may be made of the elastic body to alleviate an impact applied to the foot of a patient in the heel strike step.

Meanwhile, it is preferable that the rotating axis of the hinge member C of the rear connecting part 5 is disposed on or behind the load line LL when viewed from a side based on a gait proceeding direction at the heel strike during the gait cycle. When the rotating axis of the hinge member is positioned behind the load line LL, a rotating moment caused by the ground reaction force GRF causes the first member 5a fixed to the foot supporting part 3 to rotate in a clockwise direction. In addition, since the gait is a movement in which the human body moves forward, inertia in which the lower leg rotates clockwise at the heel strike occurs, and thus, even if the rotating axis of the hinge member is positioned on the line of the load line LL, the first member 5a fixed to the foot supporting part 3 rotates clockwise. Therefore, the patient can walk with stability without falling.

Figure 5:
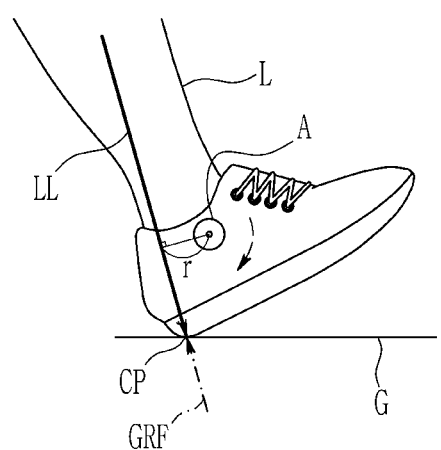
FIG. 5 illustrates a schematic view for explaining a load line and ground reaction force GRF in a heel strike state of a general gait cycle.

FIG. 5 illustrates a heel strike time point during a gait cycle in a state of wearing general shoes. In the gait in the state of wearing the general shoes, a rear end portion of the shoe point-contacts the ground G at the heel strike. In this case, when the rear end portion of the shoe point-contacts the ground, since the open kinetic chain (OKC) state is changed to the closed kinetic chain (CKC) state, the ground reaction force occurs. In the closed kinetic chain (CKC) state, the action-reaction force occurs at the contact point, so that the load line LL is directed to a point at which the ground and the human body are in point contact, and the ground reaction force GRF occurs in the opposite direction thereto. In this case, since the rotating axis of the ankle joint A and the subtalar joint is positioned in front of the load line LL, the rotating moment caused by the ground reaction force GRF allows the foot to be flexed to the ground such that the sole of the foot touches the ground. A rotating moment or torque at this time is proportional to a vertical distance r from an axis of the joint A to a line on which the ground reaction force GRF acts.

Since the ground reaction force (GRF) passes through a front side of the knee joint at a moment of heel strike, a knee extension moment that causes the knee to straighten occurs, while in the loading response immediately after the heel strike, as the leg rotates forward (the leg rotates forward with respect to the foot in contact with the ground) by the action of the body's forward movement inertia and the contraction of the pretibial muscles, the direction of the ground reaction force (GRF) changes rapidly to the rear side of the knee joint. Therefore, in the loading response, a knee flexion moment that causes the knee to be bent due to ground reaction force (GRF) occurs, which is offset by an internal moment generated by contraction of the quadriceps muscle to enable a stable gait without bending of the knee.

When the splint, the cast, or the ankle foot orthosis is worn, and when there is ankle stiffness due to arthritis or nerve damage, movement in the ankle and subtalar joints are restricted, so that the impact caused from the ground is neither absorbed nor distributed. In addition, the rotating moment by the ground reaction force (GRF) in the heel strike and the loading response is not absorbed by the movement of the ankle joint and the subtalar joint and concentrates on the knee joint. Therefore, at the moment of heel strike, the knee extension moment that allows the knee joint to straighten hinders forward rotation of the leg, so that it makes difficult for the body to move forward; in the loading response, the knee flexion moment that makes knee to be bent is excessive, so that the forward rotation of the lower leg is not smooth; and when the quadriceps muscles are weak, the knee is abruptly bucked, and thus, stable gait is impossible, and, if severe, the patient falls.

On the other hand, in the embodiment of FIG. 4, since the joint movement of the hinge member is free, the rearfoot plate quickly makes a plane contact with the ground by the rotational movement of the hinge joint when the rearfoot plate contacts the ground. When the rearfoot plate plane-contacts the ground at the moment of the heel strike, the load line is directed towards the ground along the longitudinal axis of the lower appendicular skeleton, and the ground reaction force GRF occurs in an opposite direction thereto. In addition, the ankle joint and the subtalar joint are positioned along the longitudinal axis of the skeleton, as shown in FIG. 2, so in this embodiment the load line and the ground reaction force GRF at the moment of the heel strike pass through the ankle and subtalar joints, reducing the vertical distance from the joint axis to the line at which the ground reaction force GRF acts (reducing the distance to the point of action of the force). Therefore, the rotating moments acting on the ankle joint and the subtalar joint are reduced such that the movement of the joint is minimized and the joint of the hinge member compensates for the movement instead. Since the joint of the hinge member compensates for the movement of the ankle joint and the subtalar joint even in the loading response, the rotating moment caused by the ground reaction force (GRF) is not concentrated on the knee joint, so the the human body smoothly moves forward.

Figure 6:
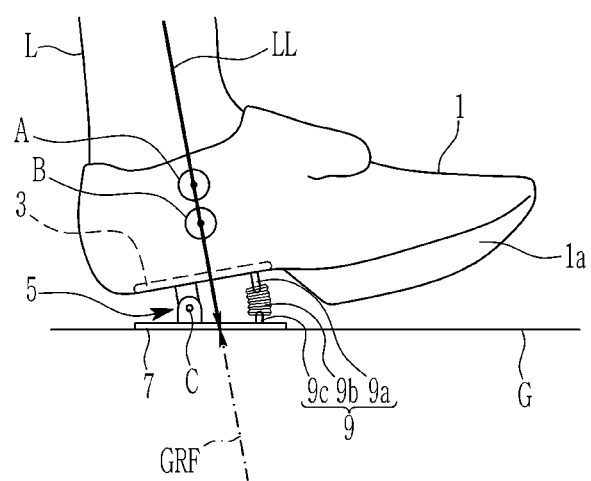
FIG. 6 illustrates a schematic view for explaining a second embodiment of the present invention and a heel strike during a gait cycle.

FIG. 6 is a schematic view for explaining a second embodiment of the present invention and illustrates a gait assistance device.

The gait assistive device according to the second embodiment of the present invention includes the foot fixing part 1, the foot supporting part 3, the rear connecting part 5, a heel part connecting member, the rearfoot plate 7, and an angle maintaining part 9.

In the second embodiment of the present invention, only differences from the description of the first embodiment will be described, and the same contents will be replaced by the description of the first embodiment.

The angle maintaining part 9 is for improving stability at the heel strike in patients with a weak muscle of the coxa or knee joint or poor balance ability. The angle maintaining part 9 causes the rearfoot plate 7 to tilt to a predetermined angle when no force is applied to the rearfoot plate 7. Therefore, the rearfoot plate 7 plane-contacts with the ground G at a moment of the heel strike of a next cycle.

The angle maintaining part 9 of the second embodiment of the present invention may be disposed at a front side (based on the proceeding direction of the gait) of the rearfoot plate 7.

The angle maintaining part 9 serves to restore the original state to the pitch angle at the heel strike (the angle between the ground and the foot at the heel strike) during the heel off or toe off of the stance phase or the swing phase.

That is, the angle maintaining part 9 maintains the heel strike pitch angle when the rearfoot plate 7 is separated from the ground during the gait cycle, and thus, a patient can stably walk at a next heel strike.

The angle maintaining part 9 includes a first member 9a coupled to the foot supporting part 3, an elastic member 9b coupled to the first member 9a, and a second member 9c for connecting the elastic member 9b and the rearfoot plate 7. The first member 9a and the second member 9c may serve to support the elastic member 9b. The elastic member 9b may be made of a synthetic resin material having a spring that is compressed when a predetermined force is applied thereto and then restored to an initial position, or excellent restoring force.

An angle (a) (shown in FIG. 10) between the rearfoot plate 7 and foot supporting part 3 may be set in a range of 10 degrees to 30 degrees, preferably in a range of 20 degrees to 25 degrees. However, the angle maintaining part 9 may be made to have a structure in which a medical staff may directly set it in a field according to a condition of the patient. The angle maintaining part 9 has a function of maintaining a heel strike pitch angle during the swing phase and the second half of the stance phase, and also has a load adjusting function to adjust the load applied along the load line during the first half of the stance phase. In the embodiment of the present invention, when the angle maintaining part 9 has the load adjusting function, it may be referred to as a load adjusting part in another term. When two or more angle maintaining part 9 or the load adjusting part are installed in the transverse direction, it may be referred to as a coronal adjusting part when adjusting the slope and load in the coronal plane.

Figure 7:
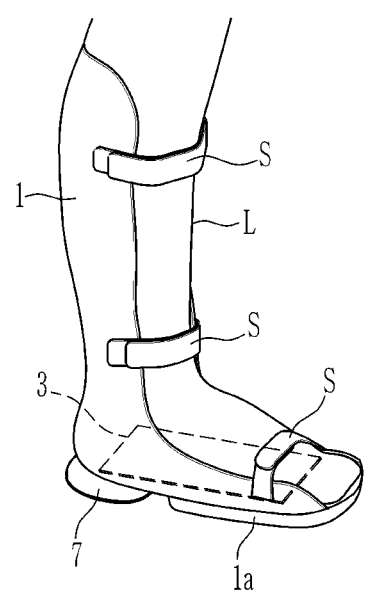
FIG. 7 illustrates a schematic view for explaining another example of the second embodiment of the present invention.

FIG. 7 illustrates a gait assistance device for explaining another example of the second embodiment of the present invention. Another example of the gait assistance device of the second embodiment of the present invention is an example consisting of an assistive device for fixing the leg by the foot fixing part 1.

The foot fixing part 1 consisting of the assistive device for fixing the leg is preferably set so that the leg part and the foot part may be maintained at an angle of about 90 degrees to each other when viewed from a side according to a state of a patient with central nervous system disease. In a case of a gait disorder caused by damage to the central nervous system such as a stroke, a significant rehabilitation treatment effect is achieved by simply walking with the gait assistive device of the present invention, in which the leg part and the foot part are set to be maintained at about 90 degrees when viewed from the side. The foot fixing part 1 may fix the foot part and the leg part by using a strap S.

As such, when the foot fixing part 1 is applied to the rehabilitation treatment of the patient with central nervous system disease with the foot part and the leg part fixed, the patient may undergo gait rehabilitation training in a state which influence of the external moment, which is rotational force generated in each joint by the ground force GRF, and the internal moment, which is rotational force generated in each joint by the muscle contraction, is minimized. In this case, the medical staff may easily obtain, process, and standardize objective data such as a gait pitch or gait speed and gait stability related to the gait according to progress of the patient's condition.

In addition, the foot fixing part 1 may be formed in a hinge-coupled form to be able to adjust angles of the leg part and the foot part when view from the side, as another example (not shown). In this case, a structure in which the medical staff or the patient may directly adjust the angles of the leg part and the foot part may be applied.

Figure 8:
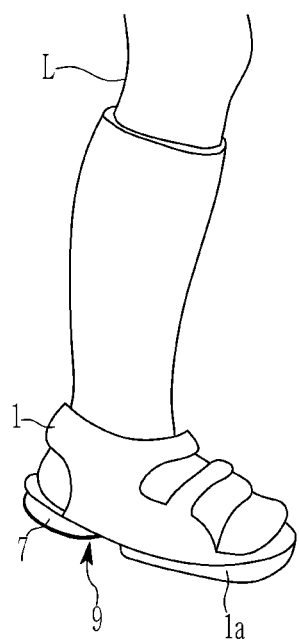
FIG. 8 illustrates a schematic view for explaining still another example of the second embodiment of the present invention.

FIG. 8 illustrates a schematic view for explaining still another example of the second embodiment of the present invention.

The foot fixing part 1 of the second embodiment of the present invention may be made of a sandal-type shoe, and may be used by a patient whose foot and leg are fixed with a orthopedic cast. When the patient with the orthopedic cast due to fracture of the foot or leg part wears the gait assistive device of the present invention, a natural gait is achieved, thereby further increasing the stability and treatment effect of the gait.

Particularly, the present embodiment may be used to minimize the foot joint movement of the patient suffering from diabetes, arthritis, and the like, or to fix the foot joint movement.

When the patient wearing the gait assistive device of the second embodiment of the present invention walks, a main operation process of the gait assistive device is described as follows.

FIG. 6 illustrates a state at the heel strike during the gait cycle of the second embodiment of the present invention.

In the description of the first embodiment of the present invention, the heel strike is realized in a state in which the rearfoot plate 7 is free, thereby achieving the object of the present invention. In the second embodiment of the present invention, in a state in which the elastic member 9b of the angle maintaining part 9 maintains the foot supporting part 3 and the rearfoot plate 7 at the constant angle (a) (shown in FIG. 10) by the action of a restoring force, the heel strike is realized during the gait cycle. In this case, as described in the first embodiment of the present invention, the rearfoot plate 7 plane-contacts the ground G. Therefore, for the reason described in the first embodiment of the present invention, it is possible for the patient to walk stably without hesitation or falling.

Figure 9:
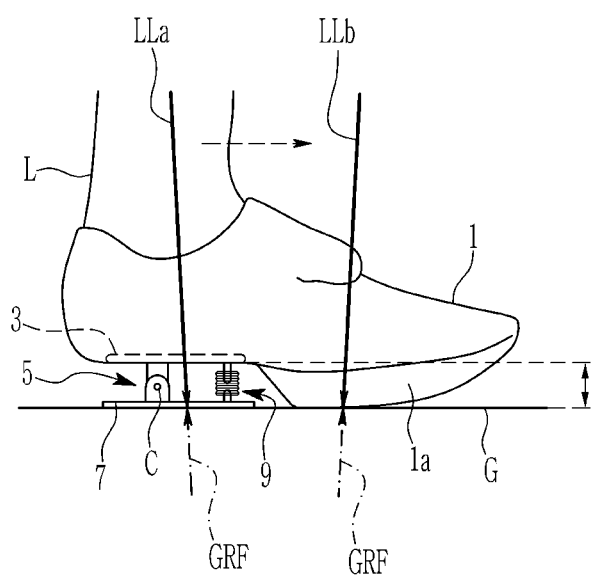
FIG. 9 illustrates a schematic view for explaining a midstance during a gait cycle of a second embodiment of the present invention.

FIG. 9 illustrates a schematic view for explaining a midstance during a gait cycle of a second embodiment of the present invention.

During the midstance of the gait cycle, the elastic member 9b of the angle maintaining part 9 is compressed to an appropriate pressure, and at the beginning of the midstance, the load line LLa is moved in front of the center axis of the rear connecting part 5, and then, at the end of the midstance, the load line LLb is moved toward the front supporting part 1a.

Figure 10:
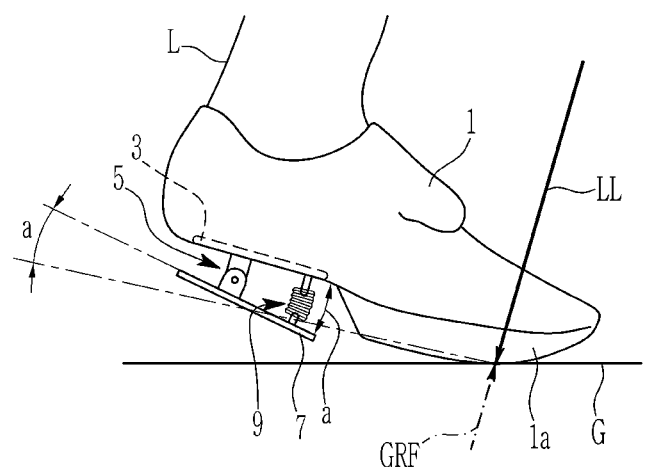
FIG. 10 illustrates a schematic view for explaining a heel off during a gait cycle of a second embodiment of the present invention.

FIG. 10 illustrates a schematic view for explaining heel off during a gait cycle of a second embodiment of the present invention.

At the heel off during the gait cycle, the load line LL moves further in the front side. In this case, the rearfoot plate 7 is separated from the ground G. Then, the rearfoot plate 7 is maintained at an initial angle at which the angle maintaining part 9 is constant by the restoring force of the elastic member 9b. The process then proceeds to the toe off.

Figure 11:
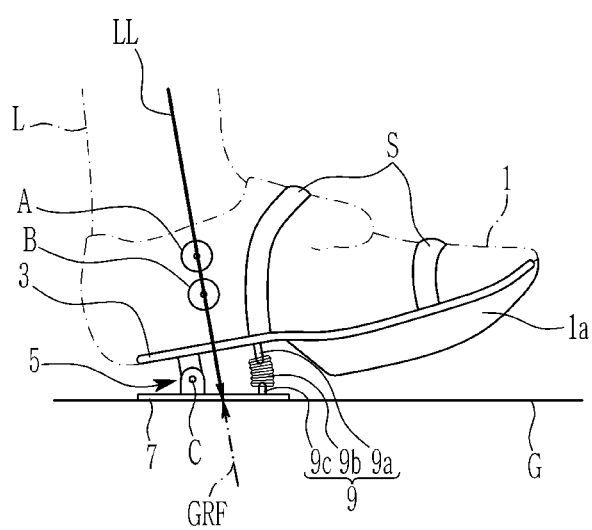
FIG. 11 illustrates a gait assistive device for explaining a third embodiment of the present invention.

FIG. 11 illustrates a gait assistive device for explaining a third embodiment of the present invention.

In the third embodiment of the present invention, the same description as that of the above-described embodiment will be replaced by the description of the above-described embodiment, and only differences therebetween will be described.

In the third embodiment of the present invention, the foot supporting part 3 is disposed long in the longitudinal direction of the foot, and the forefoot supporting part 1a is coupled to the front side of the foot supporting part 3. In addition, the fixing strap S is coupled to the foot supporting part 3. The patient or medical staff may use the strap S to fix the gait assistive device to the foot fixing part 1 of the foot or shoe. The third embodiment of the present invention may be generally and easily applied to patients with different foot sizes or various physical conditions.

Figure 12:
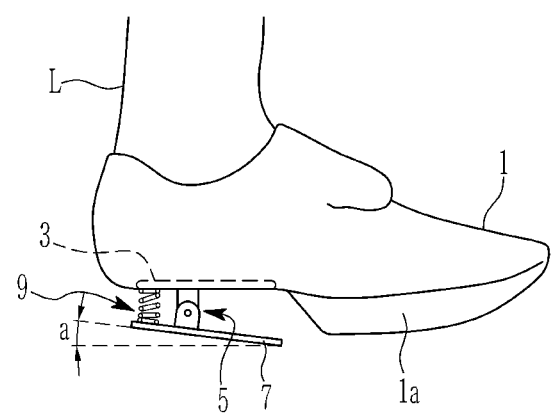
FIG. 12 illustrates a gait assistive device for explaining a fourth embodiment of the present invention.

FIG. 12 illustrates a gait assistive device for explaining a fourth embodiment of the present invention.

In the fourth embodiment of the present invention, the same description as that of the above-described embodiment will be replaced by the description of the above-described embodiment, and only differences therebetween will be described.

In the fourth embodiment of the present invention, the angle maintaining part 9 is made of a tension spring, and is installed at a rear side of the rear connecting part 5. In the fourth embodiment of the present invention, force acts in a direction in which the angle maintaining part 9 made of the tension spring always pulls the foot supporting part 3 and the rearfoot plate 7. Therefore, the fourth embodiment of the present invention may easily configure the second embodiment of the present invention, and may include various embodiments.

Figure 13:
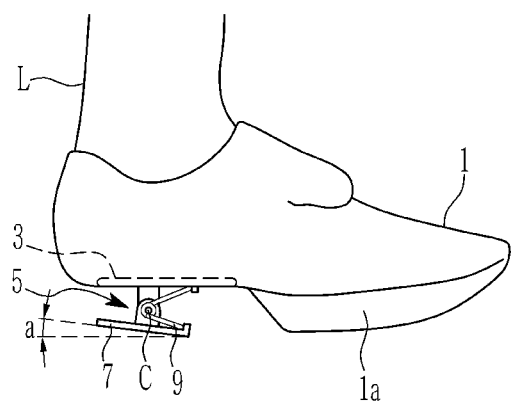
FIG. 13 illustrates a gait assistive device for explaining a fifth embodiment of the present invention.

FIG. 13 illustrates a gait assistive device for explaining a fifth embodiment of the present invention.

In the fifth embodiment of the present invention, the same description as that of the above-described embodiment will be replaced by the description of the above-described embodiment, and only differences therebetween will be described.

In the fifth embodiment of the present invention, the angle maintaining part 9 is made of a torsion spring, and is installed at the rear connecting part 5. In the fifth embodiment of the present invention, force acts in a direction in which the angle maintaining part 9 made of the torsion spring always pushes the foot supporting part 3 and the rearfoot plate 7. Therefore, according to the fifth embodiment of the present invention, component parts thereof are gathered and disposed in one place, thereby simplifying appearance thereof and reducing manufacturing costs thereof. The fifth embodiment of the present invention may also be configured, and include various embodiments.

Figure 14:
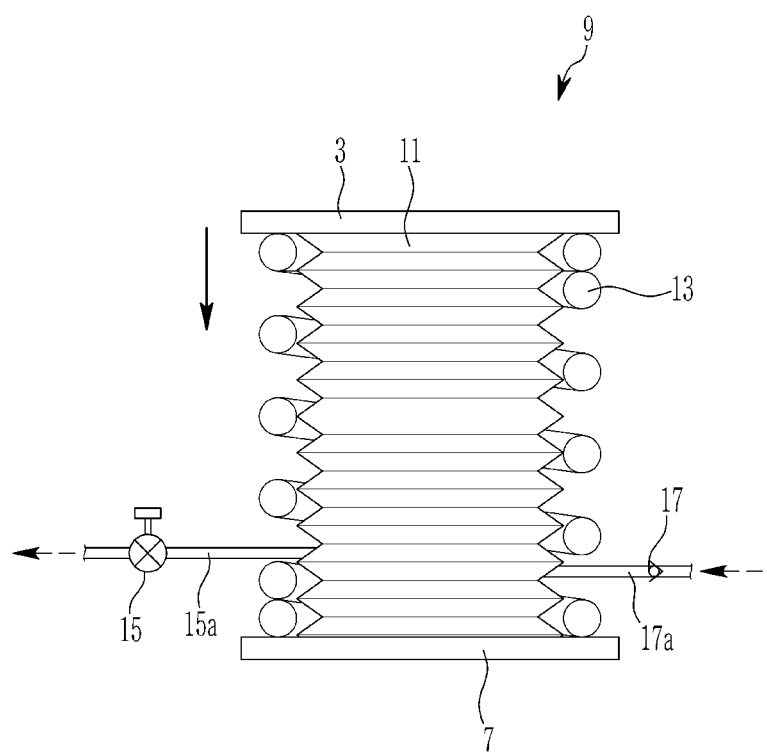
FIG. 14 illustrates a schematic view of an angle maintaining part that may set an angle of a rearfoot plate of a gait assistive device for explaining a sixth embodiment of the present invention.

FIG. 14 illustrates a schematic view of an angle maintaining part 9 that may set an angle of a rearfoot plate 7 of a gait assistive device for explaining a sixth embodiment of the present invention.

In the sixth embodiment of the present invention, the same description as that of the above-described embodiment will be replaced by the description of the above-described embodiment, and only differences therebetween will be described.

The sixth embodiment of the present invention has a structure in which the medical staff may properly adjust the angle maintaining section 9 according to the condition of the patient. That is, the angle maintaining part 9 of the sixth embodiment of the present invention may include an air chamber 11, a return spring 13, a flow adjusting valve 15, and a check valve 17.

The air chamber 11, which is a space into which outside air may be introduced, may be formed to have a bellows shape. The air chamber 11 may be disposed between the foot supporting part 3 and the rearfoot plate 7. The air chamber 11 may be disposed between the foot supporting part 3 and the rearfoot plate 7, thus both ends thereof may be fixed. The return spring 13 may be disposed outside the air chamber 11. The air chamber 11 may also be disposed between the foot supporting part 3 and the rearfoot plate 7. The flow control valve 15 may be installed in a conduit 15a connected to the air chamber 11, or may be directly installed in the air chamber 11. The flow adjusting valve 15 may be adjusted to control the speed of air discharged from the air chamber 11 by manually or automatically adjusting a size of a discharge passage.

Since the medical staff adjusts an amount of the air discharged to the air chamber 11 through the flow adjusting valve 15 according to the condition of the patient, the flow adjusting valve 15 may set the angle of the rearfoot plate 7 at an optimum value. The check valve 17 prevents outside air from being discharged to the outside while allowing the outside air to flow into the air chamber 11. The check valve 17 may be installed in a conduit 17a connected to the air chamber 11, or may be directly installed in the air chamber 11.

Although the description of the embodiment of the present invention uses a pneumatic mechanism as an instance to explain the air chamber 11, the chamber is not limited to using air as a medium and it can utilize a fluid consisted of both air and liquid.

Hereinafter, an operational process of the sixth embodiment of the present invention will be described.

The air chamber 11 is compressed while the patient walks. In this case, the medical staff adjusts a degree to which the air chamber 11 is compressed. Thus, when some of the air of the air chamber 11 is discharged to the outside through the flow adjusting valve 15, the air chamber 11 is not compressed any more and is maintained in the adjusted state. The air chamber 11 is restored to an initial state by the return spring 13 at the heel off during the gait cycle. In this case, while the air chamber 11 is restored to an initial position, outside air is introduced into the air chamber 11 through the check valve 17 by a negative pressure of the air chamber 11. Therefore, even though the patient repeatedly walks, the medical staff may always set an inclination of the rearfoot plate 7 at a desired value set by the medical staff.

The sixth embodiment of the present invention may be adapted to gait assistive devices customized to patients of various conditions.

In the first to sixth embodiments of the present invention, the rearfoot plate 7 of the gait assistive device may be set at an inclination with respect to a sagittal plane corresponding to the longitudinal direction.

Figure 15:
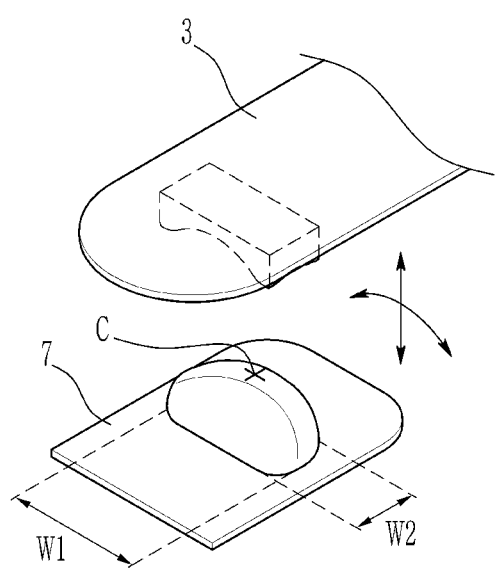
FIG. 15 illustrates a rear connecting part of a gait assistance device for explaining a seventh embodiment of the present invention.
Figure 16:
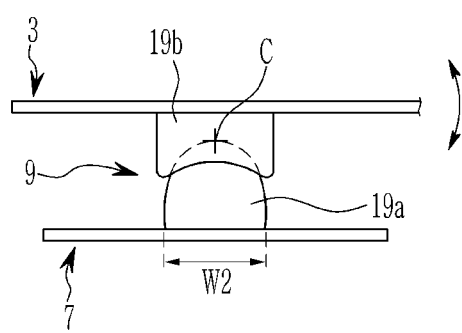
FIG. 16 illustrates a side view of a state in which the rear connecting part of FIG. 15 is assembled.
Figure 17:
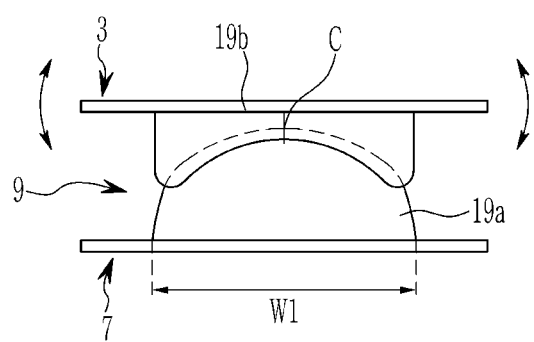
FIG. 17 illustrates a rear side of a state in which the rear connecting part of FIG. 15 is assembled.

FIG. 15 illustrates a rear connecting part 5 of a gait assistance device for explaining a seventh embodiment of the present invention, FIG. 16 illustrates a side view of a state in which the rear connecting part of FIG. 15 is assembled, and FIG. 17 illustrates a rear side of a state in which the rear connecting part of FIG. 15 is assembled.

In the seventh embodiment of the present invention, the same description as that of the above-described embodiment will be replaced by the description of the above-described embodiment, and only differences therebetween will be described.

The seventh embodiment of the present invention is an example having a structure in which the inclination at the sagittal plane (the pitch) of the rear connecting part 5 and the inclination at the coronal plane (the roll) thereof may be adjusted at the same time.

The rear connecting part 5 of the seventh embodiment of the present invention may be formed of an ellipsoid joint. That is, the rearfoot plate 7 may be integrally molded with or coupled to a convex portion 19a of an ellipsoid, and the foot supporting part 3 may be integrally molded with or coupled to a concave portion 19b of the ellipsoid corresponding to the convex portion 19a of the ellipsoid. It may be made of a structure that is molded or bonded. Of course, the rearfoot plate 7 may be integrally molded with or coupled to the concave portion of the ellipsoid, and the foot supporting part 3 may be integrally molded with or coupled to the convex portion of the ellipsoid.

Referring to FIG. 15, the convex portion 19a of the ellipsoid formed in the rearfoot plate 7 has a width w1 in the width direction of the foot and a width w2 in the length direction of the foot. The width w1 in the width direction is formed larger than the width w2 in the length direction, and an upper surface thereof forms an ellipsoid. Of course, the ellipsoid concave portion 19b formed in the foot supporting part 3 is formed in a shape corresponding to the ellipsoid convex portions 19a formed in the rearfoot plate 7 and is coupled thereto. The seventh embodiment of this invention has two degrees of freedom in which the rearfoot plate 7 may move in the sagittal plane and the coronal plane. Since such a structure of the seventh embodiment of the present invention allows the rearfoot plate 7 to move not only in the sagittal plane but also in the coronal plane, it can sufficiently help with the patient's stable gait.

In another example of the seventh embodiment of the present invention, a saddle joint having two degrees of freedom may be applied to the rear connecting part 5.

Figure 18:
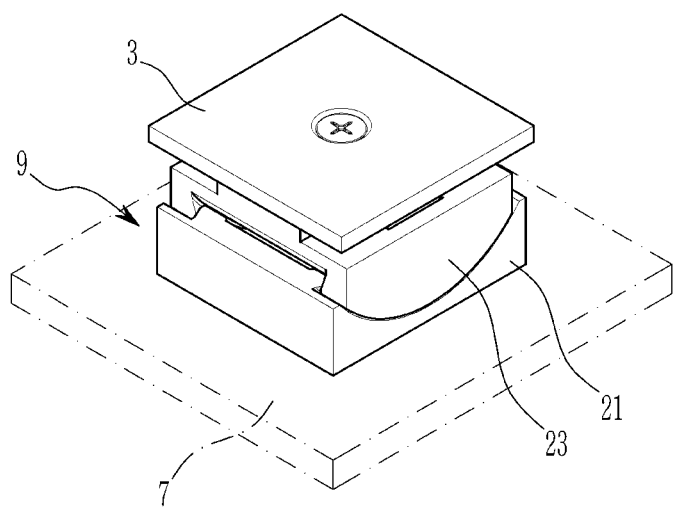
FIG. 18 illustrates a rear connecting part of a gait assistance device for explaining an eighth embodiment of the present invention.
Figure 19:
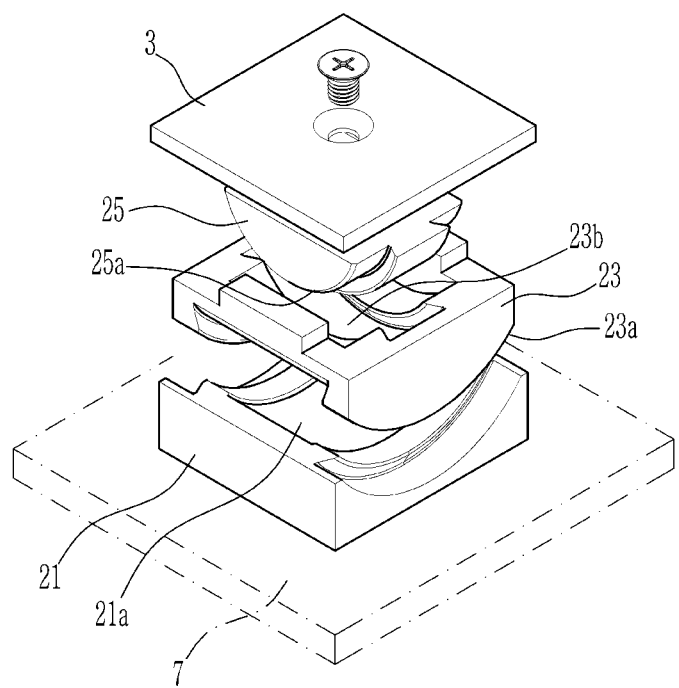
FIG. 19 illustrates an exploded perspective view of a main part of the rear connecting part of the gait assistance device shown in FIG. 18.

FIG. 18 illustrates a rear connecting part 5 of a gait assistance device for explaining an eighth embodiment of the present invention, and FIG. 19 illustrates an exploded perspective view of a main part of the rear connecting part 5 of the gait assistance device shown in FIG. 18.

In the eighth embodiment of the present invention, the same description as that of the above-described embodiment will be replaced by the description of the above-described embodiment, and only differences therebetween will be described. The rear connecting part 5 of the eighth embodiment of the present invention has a structure having two degrees of freedom as in the seventh embodiment. The rear connecting part 5 of the eighth embodiment of the present invention includes a first member 21 coupled to the rearfoot plate 7, a second member 23 coupled to the first member 21 to move in the sagittal plane, and a third member 25 coupled to the second member 23 to move in the coronal plane and to be coupled to the foot supporting part 3.

The first member 21 is formed with a concave curved portion 21a to allow the second member 23 to move to the sagittal plane. In addition, the second member 23 is formed with a convex curved portion 23a corresponding to the concave curved portion 21a. Further, another concave curved portion 23b is formed on an upper surface of the second member 23. The concave curved portion 23b formed on the second member 23 is preferably formed to be perpendicular to the concave curved portion 21a formed on the first member 21. In addition, the third member 25 is formed with another convex curved portion 25a corresponding to the concave curved portion 23b of the second member 23.

The rear connecting part 5 of the eighth embodiment of the present invention configured as described above has two degrees of freedom as in the rear connecting part 5 described in the seventh embodiment, and It may move more scurely the rearfoot plate 7 to the sagittal and coronal planes while sufficiently supporting the patient's weight.

Both the seventh and eighth embodiments correspond to joints that have two degrees of freedom, which are capable of rotational movement in the sagittal plane and in the coronal plane, and in another embodiment, universal joints may be applied.

Figure 20:
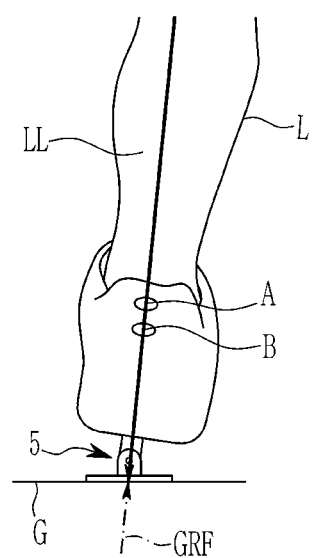
FIG. 20 illustrates a rear portion of a foot in a state in which a load line and ground reaction force GRF pass through an ankle joint and a subtalar joint in the seventh and eighth embodiments of the present invention.

FIG. 20 illustrates a rear portion of a foot in a coronal plane, in a state in which a load line passes through an ankle joint and a subtalar joint in the seventh and eighth embodiments of the present invention.

Since a joint of the rear connecting part may be rotated in the coronal plane, the load line is directed to the ground along the longitudinal axis of the lower appendicular skeleton even in the coronal plane as in the first embodiment of FIG. 4. Therefore, the rotating moments acting on the ankle joint and the subtalar joint are reduced even in the coronal plane, so that the movement of the joint is minimized, and the joint of the rear connecting part compensates for the pronation movements of the subtalar joint instead. Therefore, the patient may perform a more stable gait.

Figure 21:
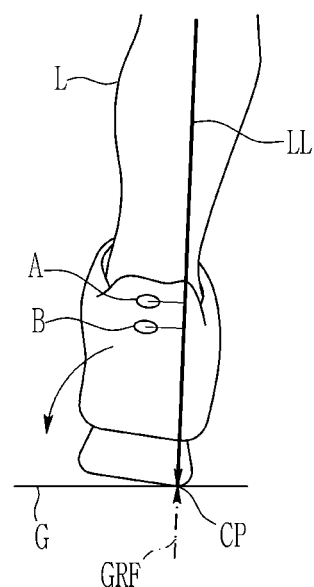
FIG. 21 illustrates a schematic view for explaining a conventional example corresponding to FIG. 20.

FIG. 21 illustrates a schematic view for explaining a conventional example corresponding to FIG. 20.

FIG. 21 illustrates a point time of the heel strike in the coronal plane, during the gait cycle in a state of wearing a general shoe. In the gait in the state of wearing the general shoe, a point contact is made between the ground G and the outside of the shoe at a moment of the heel strike.

As in FIG. 5 showing the sagittal plane, the load line LL and the ground reaction force GRF are generated at the contact point. The rotational moment cause by the ground reaction force (GRF) rotates the foot located below the subtalar joint B in a direction of an arrow in the coronal plane (see FIG. 21).

In the normal case, the rotating moment causes pronation movement of the subtalar joint to absorb and disperse an impact from the ground, but when normal movements of the joints of the ankle and the foot are impossible, the gait stability is reduced.

Figure 22:
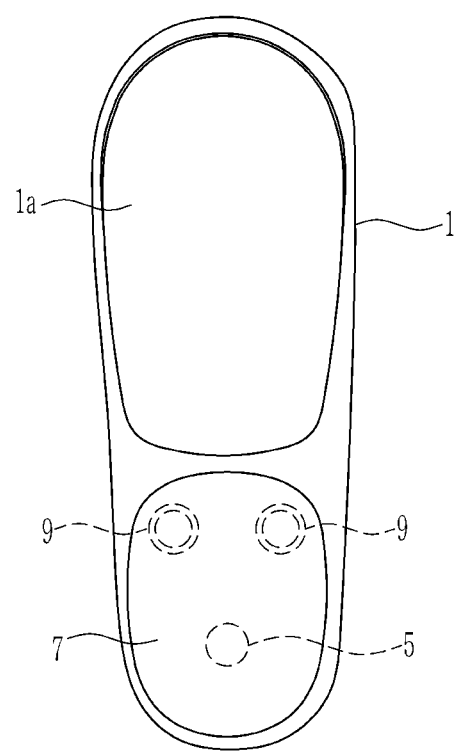
FIG. 22 illustrates a bottom view of a gait assistive device for explaining a ninth embodiment of the present invention.

FIG. 22 illustrates a bottom view of a gait assistive device for explaining a ninth embodiment of the present invention.

The ninth embodiment of the present invention has a structure in which two angle maintaining parts 9 are disposed side by side in the rearfoot plate 7 in the width direction of the rearfoot plate 7 so that the rearfoot plate 7 corresponds to all movements of the sagittal plane and the coronal plane. In this case, the angle maintaining part 9 described in the above-described embodiment may be used. In the ninth embodiment of the present invention, the inclination of the sagittal plane and the inclination of the coronal plane of the rearfoot plate 7 may be simultaneously set. According to the structure of the ninth embodiment of the present invention, the gait of the patient may be more stable.

Figure 23:
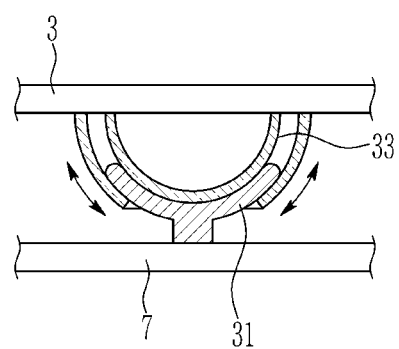
FIG. 23 illustrates a schematic view of a rear connecting part of a gait assistance device for explaining a tenth embodiment of the present invention.

FIG. 23 illustrates a schematic view of a rear connecting part 5 of a gait assistance device for explaining a tenth embodiment of the present invention.

In the tenth embodiment of the present invention, the same description as that of the above-described embodiment will be replaced by the description of the above-described embodiment, and only differences therebetween will be described.

The tenth embodiment of the present invention shows an example in which the rear connecting part 5 has a ball and socket joint structure. In the tenth embodiment of the present invention, an accommodating part 31 is coupled to the rearfoot plate 7, and a ball part 33 that is in contact with the accommodating part 31 is coupled to the foot supporting part 3. The accommodating part 31 and the ball part 33 are preferably formed to have a hemispherical shape. According to this structure, due to the spherical shape, it is possible to lower the heights of the foot supporting part 3 and the rearfoot plate 7, and at the same time, to ensure the stability of operation. The tenth embodiment of the present invention shows the features that have multiple degrees of freedom and in which the ball joint (or ball-socket joint) may be applied to the present invention.

Figure 24:
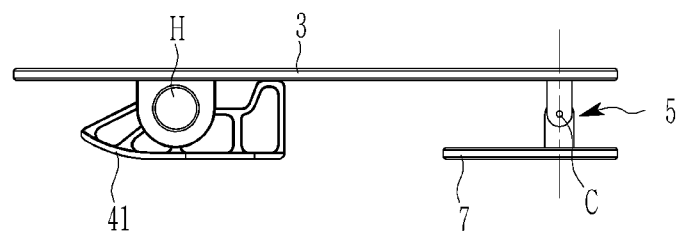
FIG. 24 illustrates a schematic view of a gait assistance device for explaining an eleventh embodiment of the present invention.

FIG. 24 illustrates a schematic view of a gait assistance device for explaining an eleventh embodiment of the present invention.

The rear connecting part 5 of the eleventh embodiment of the present invention may be made of a universal joint having two degrees of freedom. In addition, the foot supporting part 3 is made long in the longitudinal direction of the foot. Further, a front supporting part 41 hinged to the front side of the foot supporting part 3 may be provided. The eleventh embodiment of the present invention also shows that the present invention may be variously configured.

Figure 25:
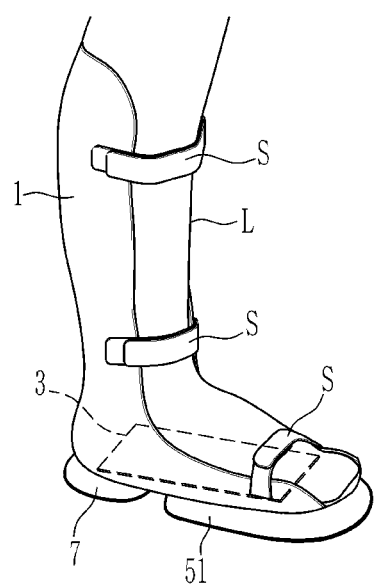
FIG. 25 illustrates a schematic view of a gait assistance device for explaining a twelfth embodiment of the present invention.

FIG. 25 illustrates a schematic view of a gait assistance device for explaining a twelfth embodiment of the present invention.

In the twelfth embodiment of the present invention, the same description as that of the above-described embodiment will be replaced by the description of the above-described embodiment, and only differences therebetween will be described.

In the gait assistive device of the twelfth embodiment of the present invention, the foot fixing part 1 consists of an assistive device for fixing the leg and the foot.

The foot fixing part 1 consisting of the assistive device for fixing the leg is preferably set so that the leg part and the foot part may be maintained at an angle of about 90 degrees to each other, in a sectional view, according to the state of the patient with the central nervous system disease. In the case of the gait disorder caused by the damage to the central nervous system such as a stroke, a significant rehabilitation treatment effect is achieved by simply walking with the gait assistive device of the present invention, which is set at a state in which the leg and the foot are maintained at about 90 degrees when viewed from the side. The foot fixing part 1 may fix the foot supporting part 3 with a fastening member such as a screw, and it may be integrally formed with the foot supporting part 3.

The foot fixing part 1 fixing the leg part and the foot part may fix the foot part and the leg part by using the strap S.

In addition, the foot supporting part 3 may be coupled to a forefoot plate 51. The forefoot plate 51 may have the same structure as that of the thirteenth embodiment, so a description thereof will be replaced by that of the thirteenth embodiment.

Figure 26:
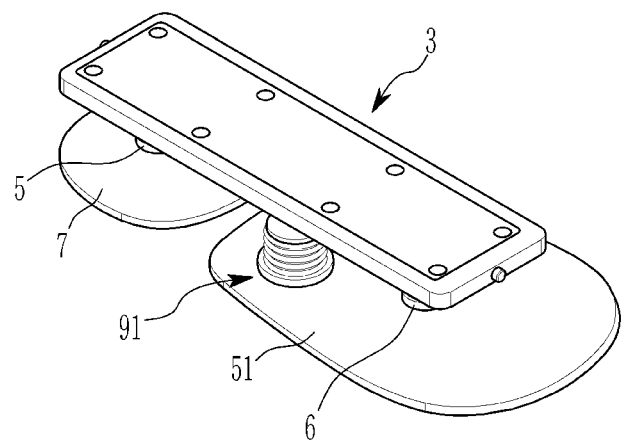
FIG. 26 illustrates a schematic view of a gait assistance device for explaining a thirteenth embodiment of the present invention.
Figure 27:
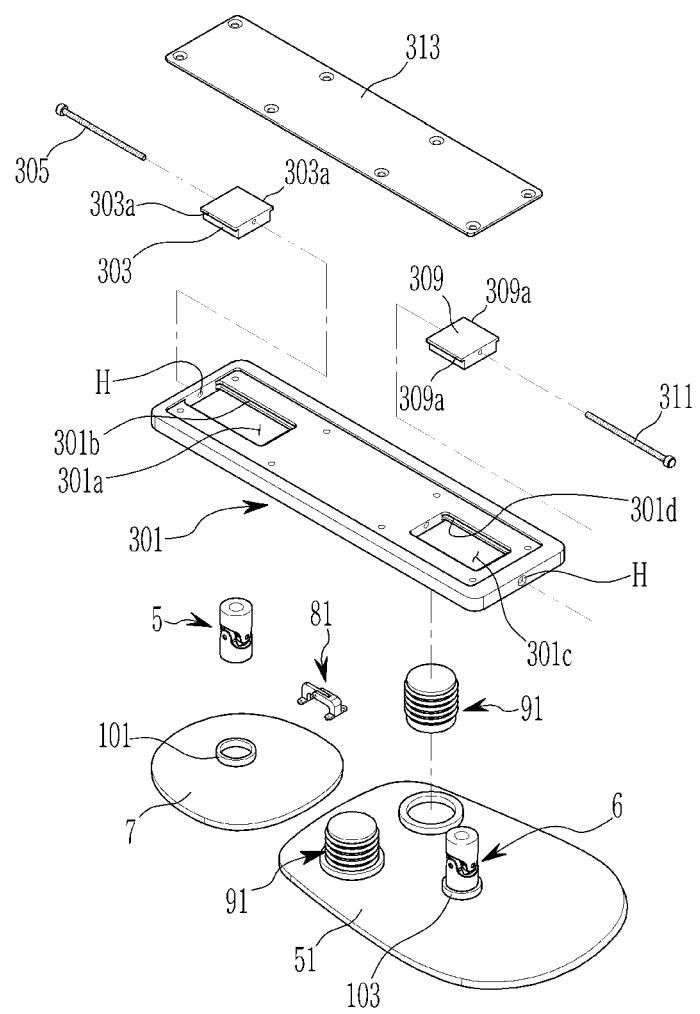
FIG. 27 illustrates an exploded perspective view of a main part of FIG. 26.

FIG. 26 illustrates a schematic view of a gait assistance device for explaining a thirteenth embodiment of the present invention, and FIG. 27 illustrates an exploded perspective view of a main part of FIG. 26.

The gait assistive device of the thirteenth embodiment of the present invention includes the foot supporting part 3, the rear connecting part 5, the rearfoot plate 7, a front connecting part 6, the forefoot plate 51, a plate connecting part 81, and a coronal adjusting part 91.

In the thirteenth embodiment of the present invention, the same description as that of the above-described embodiment will be replaced by the description of the above-described embodiment, and only differences therebetween will be described.

Figure 28:
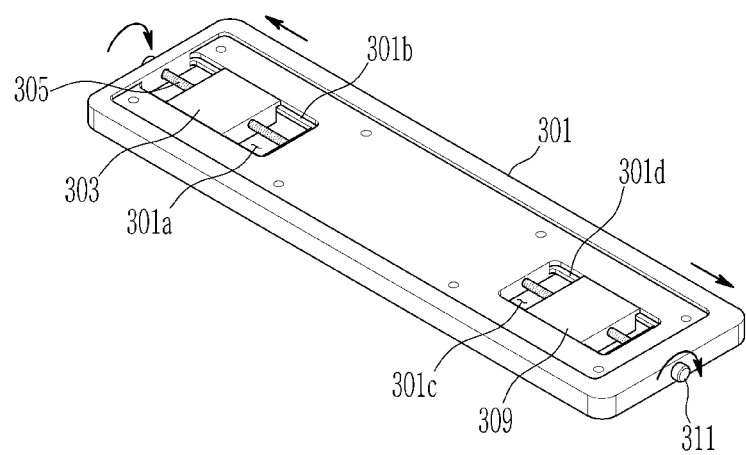
FIG. 28 illustrates a schematic view of a foot supporting part of the thirteenth embodiment of the present invention.

The foot supporting part 3 of the thirteenth embodiment of the present invention will be described with reference to FIG. 27 to FIG. 29. The foot supporting part 3 of the thirteenth embodiment of the present invention may include a base 301, a rear moving member 303, a rear adjusting member 305, a front moving member 309, a front adjusting member 311, and a cover 313.

The base 301 is formed long in the length direction of the foot. The base 301 is formed with a slide hole 301a at a rear side thereof. Guide grooves 301b are formed in a longitudinal direction of the base 301 at both sides of the slide hole 301a.

The rear moving member 303 is inserted into the slide hole 301a, and is provided with a guide protrusion 303a corresponding to the guide groove 301b. Accordingly, the rear moving member 303 may move along the guide groove 301b in the longitudinal direction of the base 301. On the other hand, a central portion of the base 301 is provided with a hole h in the longitudinal direction in the center portion. The rear moving member 303 is provided with a screw hole 303c in a longitudinal direction thereof. The rear adjusting member 305 may be made of a bolt member having a thread formed on an outer circumferential surface thereof. The rear adjusting member 305 may be coupled to the hole h of the base 301 and the screw hole 303c of the rear moving member 303 to move the rear moving member 303 in the longitudinal direction of the base 301 while fixing the rear moving member 303 to the base 301

On the other hand, the rear moving member 303 is coupled to one side of the rear connecting part 5. Therefore, the rear moving member 303 may move a central axis of the rear connecting part 5 while moving in the longitudinal direction of the base 301. According to this structure, it is possible to move the axis of the rear connecting part 5 to the rear side of the load line LL in consideration of the load line LL according to the condition of the patient.

In addition, the base 301 is provided with another slide hole 301c at the front side thereof. Guide grooves 301d are formed in the longitudinal direction of the base 301 at both sides of the slide hole 301c.

The front moving member 309 is inserted into the slide hole 301c, and is provided with a guide protrusion 309a corresponding to a guide groove 301d. Accordingly, the front moving member 309 may move in the longitudinal direction of the base 301 along the guide groove 301d. Meanwhile, a central portion of the base 301 is provided with another hole h in the longitudinal direction thereof. The front moving member 309 is provided with a screw hole 309c in the longitudinal direction. The front adjusting member 311 may be made of a bolt member formed with a thread on an outer circumferential surface thereof. The front adjusting member 311 may be coupled to the hole h of the base 301 and the screw hole 309c of the front moving member 309 to move the front moving member 309 in the longitudinal direction while fixing the front moving member 309 to the base 301.

On the other hand, the front moving member 309 is coupled to one side of the front connecting part 6. Therefore, the front moving member 309 may move a central axis of the front connecting part 6 while moving in the longitudinal direction of the base 301. According to this structure, it is possible to move the axis of the front connecting part 6 to the rear side of the load line LL in consideration of the load line LL according to the condition of the patient.

Meanwhile, the cover 313 may be coupled to the base 301 to fix the rear moving member 303 and the front moving member 309 to be not separated toward the outside.

Figure 29:
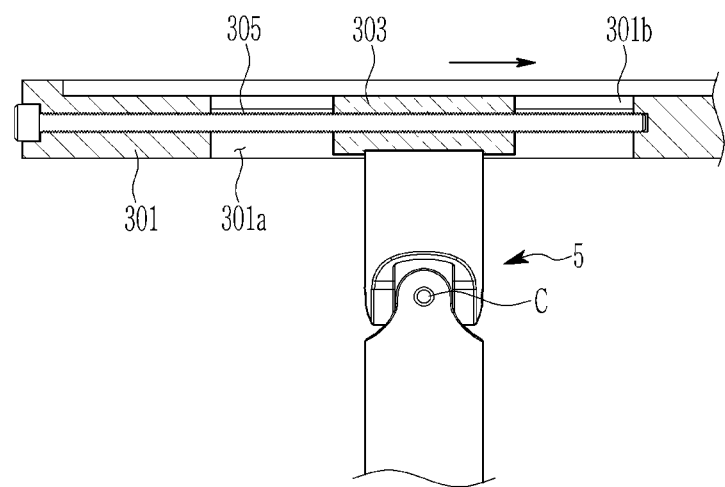
FIG. 29 illustrates a schematic view for explaining a setting process of a rear connecting part coupled to the foot supporting part according to the thirteenth embodiment of the present invention.

Referring to FIG. 29, when it is necessary to move an axis C of the rear connecting part 5 in the longitudinal direction, the medical staff moves the rear moving member 303 in consideration of the condition of the patient and the load line LL. That is, when the rear adjusting member 305 is rotated, the rear adjusting member 305 rotates in place. Then, the rear adjusting member 305 is screw-coupled to the rear moving member 303, so that the rear moving member 303 moves in the longitudinal direction of the base 301 along the guide groove 301b of the base 301 and the guide protrusion 303a of the rear moving member 303.

Since the front moving member 309 may also move in the same manner as in the rear moving member 303, a description of a moving process of the front moving member 309 is replaced with the above description.

In the thirteenth embodiment of the present invention, the rear connecting part 5 and the front connecting part 6 may be made of a universal joint. However, the rear connecting part 5 and the front connecting part 6 may include the examples described in the above-described embodiment.

The rear connecting part 5 and the front connecting part 6 may be pivotally coupled to the rearfoot plate 7 and the forefoot plate 51 by pivot coupling parts 101 and 103, respectively. Thus, the rearfoot plate 7 may have three degrees of freedom that may be rotated in the sagittal plane, the coronal plane, and a horizontal plane. In addition, the forefoot plate 51 may also be moved with three degrees of freedom.

Figure 30:
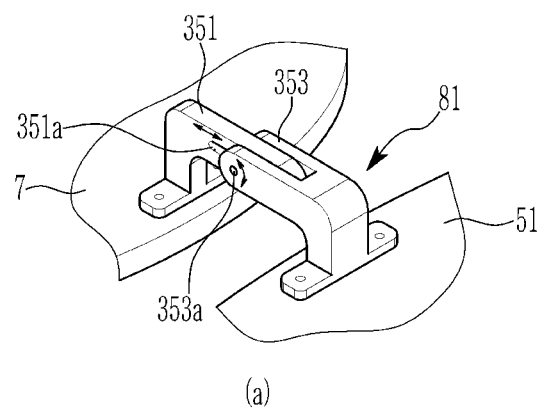
FIG. 30 illustrates a schematic view of a plate connecting part of the thirteenth embodiment of the present invention.
Figure 30:
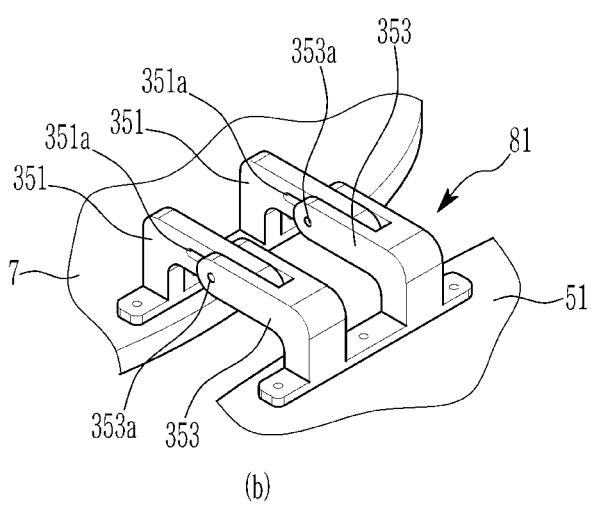

FIG. 30 illustrates a schematic view of a plate connecting part of the thirteenth embodiment of the present invention.

As drawings for explaining a plate connecting part 81 of the thirteenth embodiment of the present invention, FIG. 30 (a) shows a single type of the plate connecting part 81, and FIG. 30 (b) shows a double type of the plate connecting part 81.

The plate connecting part 81 of the thirteenth embodiment of the present invention has a pin-slot joint structure. That is, referring to FIG. 30 (a), a first link 351 is coupled to the rearfoot plate 7, and a second link 353 is coupled to the forefoot plate 51.

The first link 351 and the second link 353 extend in the longitudinal direction of the foot. The first link 351 is provided with a long hole 351a in the longitudinal direction of the foot. In addition, the second link 353 is coupled to a shaft part 353a fitted in the long hole 351a of the first link 351 in the width direction of the foot. Thus, the rearfoot plate 7 and the forefoot plate 51 are linearly translated and rotated in the sagittal plane in a linked state. FIG. 30 (b) illustrates an example in which the first link 351 and the second link 353 are disposed in pairs in the width direction of the foot. When the respective links are configured in pairs as described above, it is possible to prevent a sliding motion from being disturbed due to twisting of the rearfoot plate 7 and the forefoot plate 51. The plate connecting part 81 may be used as a single type or a double type according to design needs.

Figure 31:
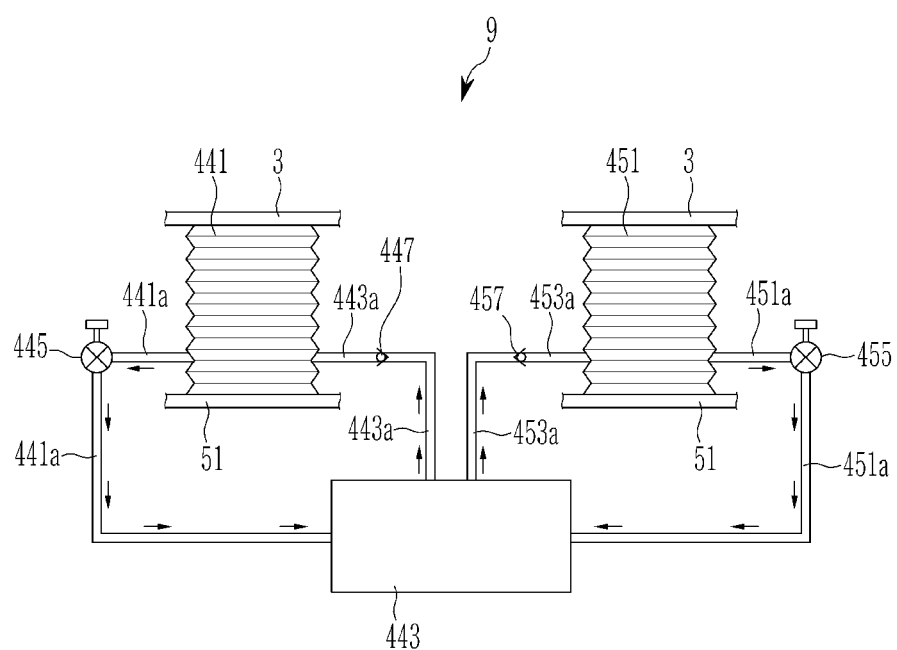
FIG. 31 illustrates an operation example of a coronal adjusting part of the thirteenth embodiment of the present invention.

FIG. 31 illustrates an operation example of a coronal adjusting part 91 of the thirteenth embodiment of the present invention.

The coronal adjusting part 91 of the thirteenth embodiment of the present invention may have a structure using liquid or hydraulic pressure. The coronal adjusting part 91 may be disposed in pairs in the width direction of the foot. The coronal adjusting part 91 disposed at a left side with reference to FIG. 31 includes a hydraulic chamber 441, a reservoir tank 443, a discharge conduit 441a, a return conduit 443a, a hydraulic control valve 445, and a check valve 447. The hydraulic chamber 441 may be a bellows type of chamber in which oil is filled, and a height thereof is variable. The hydraulic chamber 441 may discharge oil to the reservoir tank 443 through the discharge conduit 441a. The hydraulic control valve 445 is installed in the discharge conduit 441a. The hydraulic control valve 445 may be adjusted so that the medical staff may discharge the oil contained in the hydraulic chamber 441 at a desired speed and amount. The hydraulic control valve 445 may be manually operated. The return conduit 443a may be connected between the reservoir tank 443 and the hydraulic chamber 441, and thus the oil in the reservoir tank 443 may be returned to the hydraulic chamber 441. The check valve 447 is installed in the return conduit 443a so that the oil contained in the hydraulic chamber 441 may not be discharged to the return conduit 443a and the oil of the reservoir tank 443 may flow into the hydraulic chamber 441.

The coronal adjusting part 91 disposed at a right side with reference to FIG. 31 includes a hydraulic chamber 451, a reservoir tank 443, a discharge conduit 451*a*, a return conduit 453*a*, a hydraulic control valve 455, and a check valve 457. The hydraulic chamber 451 may be a bellows type of chamber in which oil is contained, and a height thereof is variable. In addition, the hydraulic chamber 451 may discharge oil to the reservoir tank 443 through the discharge conduit 451*a*. The hydraulic control valve 455 is installed in the discharge conduit 451*a*. The hydraulic control valve 455 may be adjusted so that the medical staff may discharge the oil contained in the hydraulic chamber 451 at a desired speed and amount. The hydraulic control valve 455 can be manually operated. The return conduit 453*a* may be connected between the reservoir tank 443 and the hydraulic chamber 451, and thus the oil in the reservoir tank 443 may be returned to the hydraulic chamber 451. The check valve 457 is installed in the return conduit 453*a* so that the oil contained in the hydraulic chamber 451 may not be discharged to the return conduit 453*a* and the oil of the reservoir tank 443 may flow into the hydraulic chamber 451.

Figure 36:
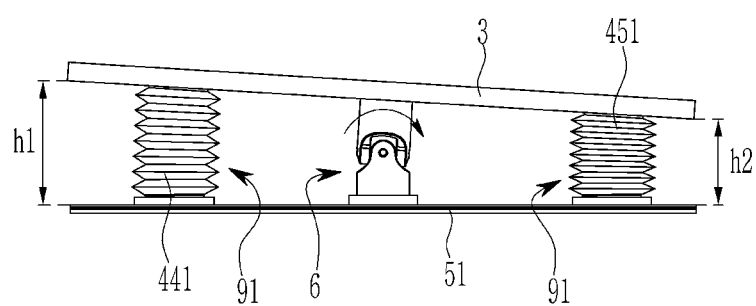
FIG. 36 illustrates an operating state of a coronal adjusting part for explaining the thirteenth embodiment of the present invention.

The coronal adjusting part 91 configured as described above adjusts the hydraulic control valves 445 and 455 according to the gait state of the patient at the heel strike during the gait cycle. That is, the medical staff controls the discharge amount of the hydraulic chambers 441 and 451 by adjusting the hydraulic control valves 445 and 455 at the heel strike during the gait cycle of the patient. The medical staff adjusts the hydraulic control valves 445 and 455 to lower heights of the hydraulic chambers 441 and 451 optimized for an individual patient (see FIG. 36). That is, as illustrated in FIG. 36, heights h1 and h2 of the left and right hydraulic chambers 441 and 451 become different to be optimized for the individual patients.

Figure 32:
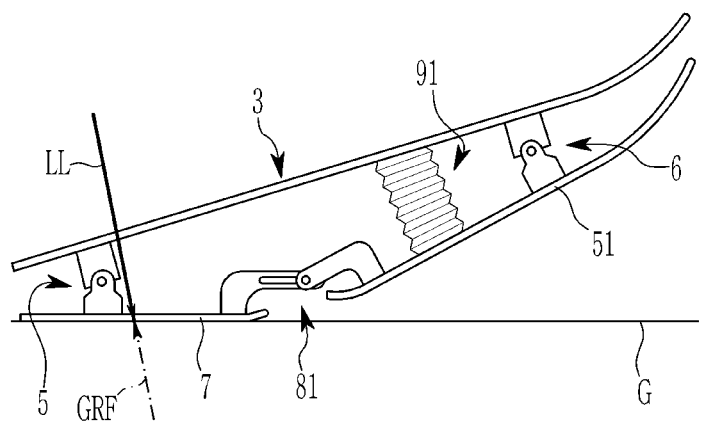
FIG. 32 illustrates a schematic view for explaining a relative position of ground reaction force GRF with respect to a joint axis of a rear connecting part at a heel strike during a gait cycle of the thirteenth embodiment of the present invention.

FIG. 32 illustrates a schematic view for explaining a relative position of a load line LL with respect to an axis of a rear connecting part at a heel strike during a gait cycle of the thirteenth embodiment of the present invention.

In the gait assistive device of the thirteenth embodiment of the present invention, a position at which the rearfoot plate 7 plane-contacts the ground G at the heel strike during the gait cycle is the same as those of the first and second embodiments described above. In the gait assistive device according to the thirteenth embodiment of the present invention, the joint axis of the rear connecting part 5 at the heel strike during the gait cycle may be set at the line of the load line LL or at the rear side of the load line LL at the heel strike during the gait cycle based on the proceeding direction of the gait. In the gait assistive device of the thirteenth embodiment of the present invention, the rearfoot plate 7 and the forefoot plate 51 may be adjusted in the sagittal plane by a coupled movement by the plate connecting part 81, and at the same time, they may be adjusted in the coronal plane by the coronal adjusting part 91.

The gait assistive device of the thirteenth embodiment of the present invention may be applied to the patient by simultaneously optimizing the adjustment of the coronal plane and the sagittal plane at the heel strike of the patient's gait cycle.

In addition, in the thirteenth embodiment of the present invention, the coronal adjusting part 91 is installed in the forefoot plate 51 having a sufficient space, which is advantageous in terms of design and manufacture.

Figure 33:
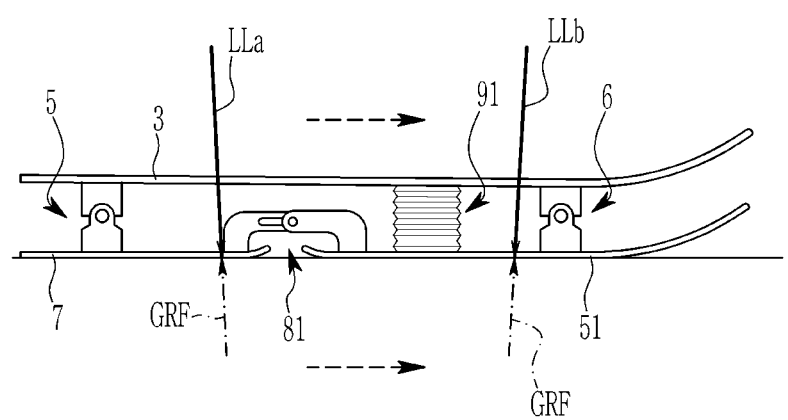
FIG. 33 illustrates a schematic view for explaining a position at which a load line and ground reaction force GRF are moved in a midstance process during a gait cycle of the thirteenth embodiment of the present invention.

FIG. 33 illustrates a schematic view for explaining a position at which the load line LL is moved in the process of the midstance during the gait cycle of the thirteenth embodiment of the present invention.

At the midstance during the gait cycle, the load line LLa at an initial time point of the midstance moves to the load line LLb at an end time point of the midstance.

A movement process of the load line LL is the same as that of the above-described embodiment.

Figure 34:
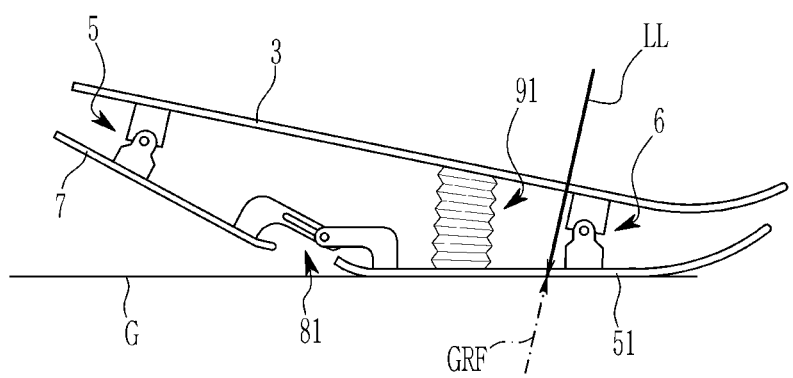
FIG. 34 illustrates a schematic view for explaining a relative position of ground reaction force GRF with respect to a joint axis of a front connecting part at a heel off during a gait cycle of the thirteenth embodiment of the present invention.

FIG. 34 illustrates a schematic view for explaining a position of the load line LL in the process of the heel off during the gait cycle of the thirteenth embodiment of the present invention.

At the heel off during the gait cycle, the rearfoot plate 7 is separated from the ground G while the load line LL moves forward.

In addition, the rearfoot plate 7 is moved in interlocking with the forefoot plate 51 by the coronal adjusting part 9 and the plate connecting part 81 such that the angle therebetween is maintained and the movement in the sagittal plane and the coronal plane may be optimized.

Figure 35:
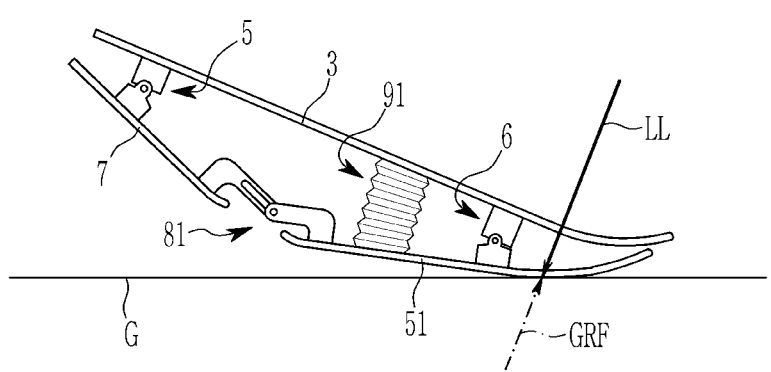
FIG. 35 illustrates a schematic view for explaining a relative position of ground reaction force GRF with respect to a joint axis of a front connecting part at a toe off during a gait cycle of the thirteenth embodiment of the present invention.

FIG. 35 illustrates a schematic view for explaining a position of the load line LL in the process of the toe off during the gait cycle of the thirteenth embodiment of the present invention.

At the toe off during the gait cycle, the load line LL moves further forward. After that, the process of the swing phase is performed. In a normal gait, the load line LL moves according to the progression force generated by swing of the contralateral leg and the forward movement of the human body in the second half of the stance phase which is from the midstance to the toe off. In this case, the movement of the joints of ankle and foot causes the foot to act like a rocker (a bottom of a rocking chair) to enable energy efficient and a smooth gait.

As shown in the thirteenth embodiment, when the joint of the front connecting part is installed between the load line formed at the heel off and the load line formed at the toe off, it may perform a function similar to a rocker, even when the joints of ankle and foot are pathological or are limited in their movement.

Figure 37:
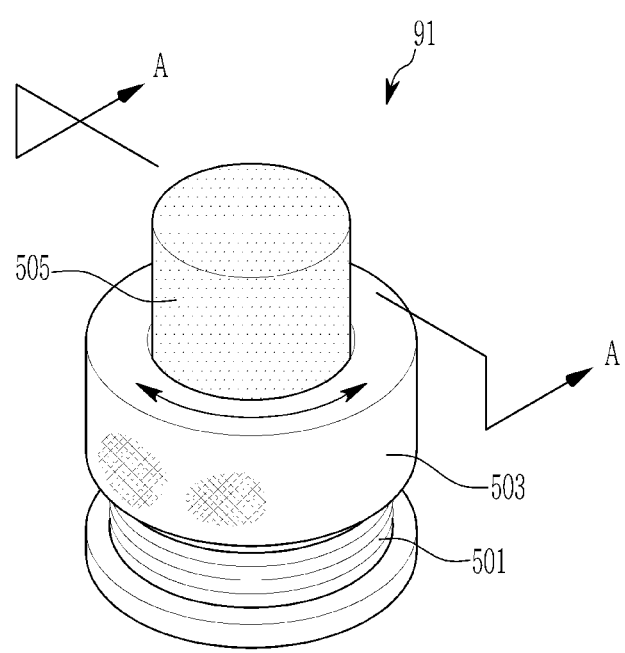
FIG. 37 illustrates a schematic view for explaining a fourteenth embodiment of the present invention.
Figure 38:
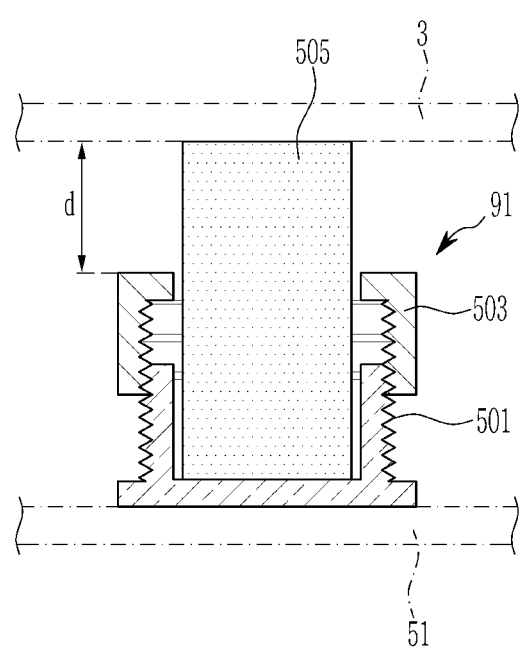
FIG. 38 illustrates a cross-sectional view taken along line A-A of FIG. 37.

FIG. 37 illustrates a schematic view for explaining a fourteenth embodiment of the present invention, and FIG. 38 illustrates a cross-sectional view taken along line A-A of FIG. 37.

The fourteenth embodiment of the present invention provides another example of the coronal adjusting part 91. The coronal adjusting part 91 of the fourteenth embodiment of the present invention includes a first member 501, a second member 503, and an elastic member 505. The first member 501 is provided with a space therein, and is coupled to the forefoot plate 51. The first member 501 is provided with a thread formed on an outer circumferential surface thereof. The first member 501 may have a cylindrical shape. The second member 503 has a cylindrical shape, and a screw groove is formed on an inner circumferential surface thereof. Therefore, the second member 503 may relatively move to the first member 501 while being screw-coupled to the first member 501 to be rotated. That is, the second member 503 may adjust a distance between the rearfoot plate 7 and an upper surface of the second member 503 while being rotated and moved to the first member 501. It is also possible for the upper surface of the second member 503 to serve as a stopper with respect to the foot supporting part 3. The elastic member 505 may be made of rubber, a synthetic resin, or the like having excellent restoring force.

At the swing phase after the toe off during the gait cycle, it may be quickly restored to the position set by the medical staff to be optimized for the patient. The fourteenth embodiment of the present invention shows that the coronal adjusting part 91 that may be set by the medical staff may be variously configured.

Figure 39:
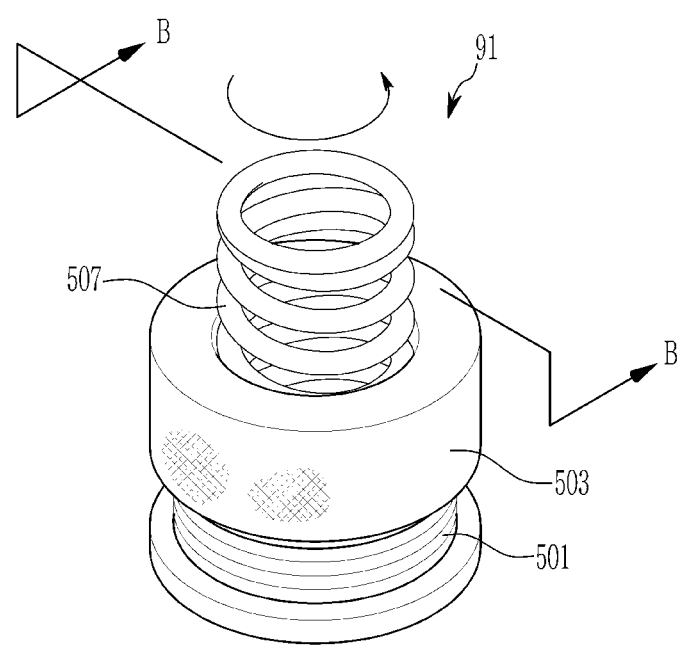
FIG. 39 illustrates a schematic view for explaining a fifteenth embodiment of the present invention.
Figure 40:
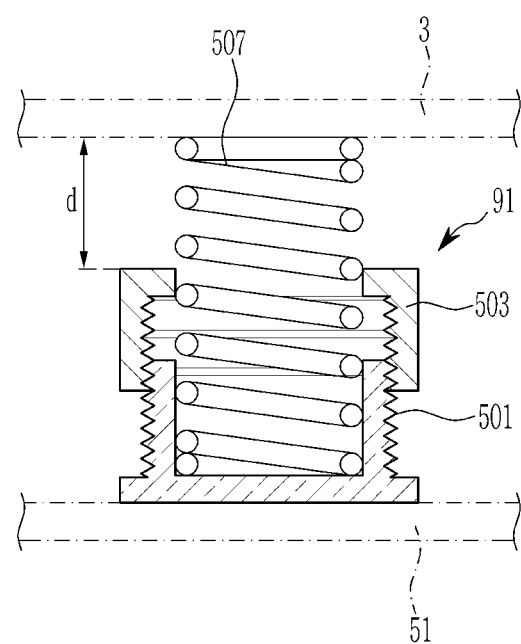
FIG. 40 illustrates a cross-sectional view taken along line B-B of FIG. 39.

FIG. 39 illustrates a schematic view for explaining a fifteenth embodiment of the present invention, and FIG. 40 illustrates a cross-sectional view taken along line B-B of FIG. 39.

The fifteenth embodiment of the present invention shows another example of the coronal adjusting part 91. Compared with the aforementioned fourteenth embodiment, a feature of the fifteenth embodiment that is different from the aforementioned fourteenth embodiment will be mainly described, and a description of the same feature as that of the aforementioned fourteenth embodiment follows that of the aforementioned fourteenth embodiment. In the fifteenth embodiment of the present invention, the elastic member includes a compression coil spring 507. A structure in which the second member 503 relatively rotates and moves to the first member 501 is the same as that of the fourteenth embodiment described above.

Figure 41:
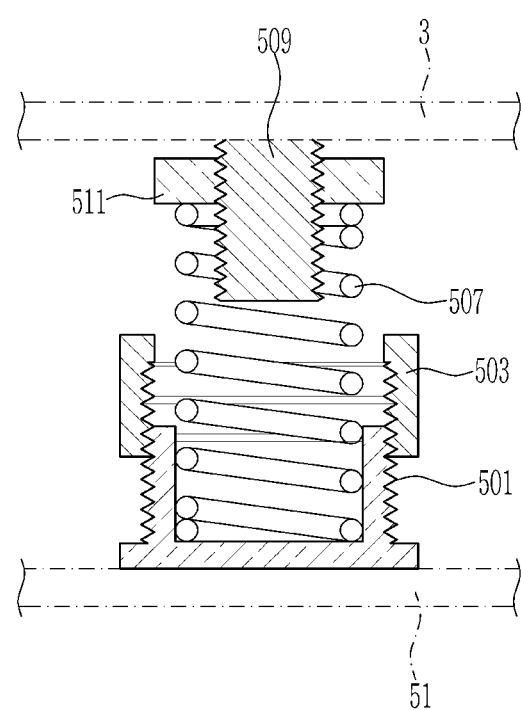
FIG. 41 illustrates a cross-sectional view for explaining a sixteenth embodiment of the present invention.

FIG. 41 illustrates a cross-sectional view for explaining a sixteenth embodiment of the present invention.

Compared with that of the sixteenth embodiment, a feature of the coronal adjusting part 91 of the sixteenth embodiment that is different from that of the aforementioned sixteenth embodiment will be mainly described, and a description of the same feature as that of the aforementioned sixteenth embodiment follows that of the aforementioned fifteenth embodiment.

The coronal adjusting part 91 of the sixteenth embodiment of the present invention further includes a guide 509 protruding in the direction of the forefoot plate 51 from the foot supporting part 3, and an angle adjusting member 511. The guide 509 may be welded or screw-coupled to the foot supporting part 3, and is threaded on an outer circumferential surface thereof. The angle adjusting member 511 is provided with a screw groove on an inner circumferential surface to be screw-coupled to the guide 509. Therefore, a distance between the foot supporting part 3 and the forefoot plate 51 may be adjusted by rotation of the angle adjusting member 511, and since the forefoot plate and the forefoot plate move while interlocking with each other, when the distance is previously set, an angle between the ground and foot can be adjusted at the heel strike. Therefore, stability may be improved at the heel strike.

Figure 42:
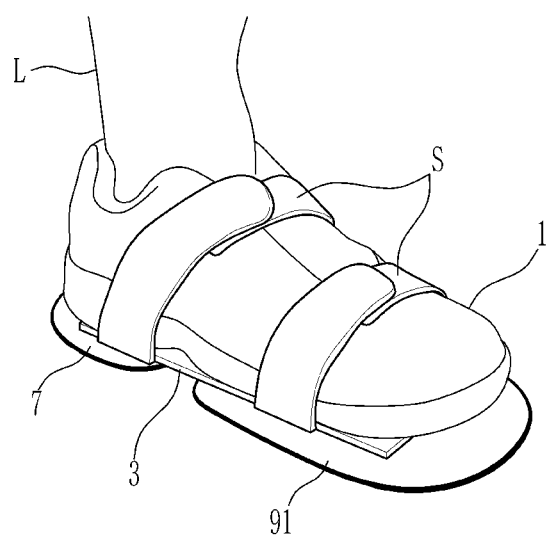
FIG. 42 illustrates a schematic view for explaining a seventeenth embodiment of the present invention.

FIG. 42 illustrates a schematic view for explaining a seventeenth embodiment of the present invention.

The seventeenth embodiment of the present invention shows a gait assistive device which may be worn on a general shoe. That is, in the gait assistive device of the seventeenth embodiment of the present invention, the foot supporting part 3 may be separately formed from the foot fixing part 1. In addition, the foot supporting part 3 is provided with the strap S, so that it may be fixed to the foot fixing part 1 such as the shoe and used. Further, the gait assistive device of the seventeenth embodiment of the present invention may include the foot supporting part 3, the rear connecting part 5, the rearfoot plate 7, the front connecting part 6, the forefoot plate 51, the plate connecting plate 81, and the coronal adjusting part 91. That is, the examples described above may be applied to the gait assistive device according to the seventeenth embodiment of the present, as it is.

Figure 43:
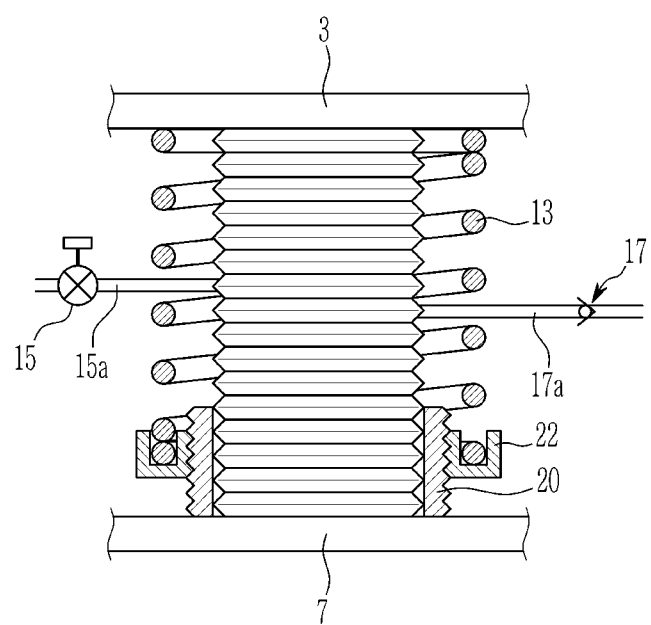
FIG. 43 illustrates a schematic view for explaining an eighteenth embodiment of the present invention.

FIG. 43 illustrates a schematic view for explaining an eighteenth embodiment of the present invention. The eighteenth embodiment of the present invention is a modification of the sixth embodiment (FIG. 14) described above.

Compared with the sixth embodiment, a feature of the eighteenth embodiment that is different from the sixth embodiment will be described. The eighteenth embodiment of the present invention further includes a first member 20 coupled to the rearfoot plate 6 and a second member 22 screw-coupled to the first member. The first member 20 has a cylindrical shape, and is provided with a space in which the air chamber 11 may be accommodated. The first member 20 is threaded on an outer circumferential surface thereof. The second member 22 has a nut shape of which an inner circumferential surface is formed with a screw groove. Therefore, the second member 22 is screw-coupled to the first member 20. The second member 22 is provided with a groove portion 22a into which the return spring 13 may be fitted in a surface facing the foot supporting part 3 along a circumferential direction. In addition, one end of the return spring 13 is fitted into the groove portion 22a of the second member 22, and the other end thereof is in contact with the foot supporting part 3. Therefore, the return spring 13 elastically supports between the foot supporting part 3 and the second member 22. The eighteenth embodiment of the present invention, as in the angle adjusting member shown in the sixteenth embodiment of FIG. 41, causes plane-contact with the ground at the heel strike, thereby increasing stability at the heel strike.

By adjusting the tension of the return spring 13, the medical staff may use it in an optimized state according to the state of the patient or gait. The gait assistive device of the embodiments of the present invention may be used as a bottom structure of a walking robot or a device for walking.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 1. foot fixing part
1a. forefoot supporting part
3. foot supporting part
5. rear connecting part
6. front connecting part
7. rearfoot plate
9. angle maintaining part
11. air chamber
13. return spring
15. flow adjusting value
17. check value
51. forefoot plate
81. plate connecting part
91. coronal adjusting part

What is claimed is:
1. A gait assistive device comprising:
a foot supporting part;
a rear connecting part coupled to a heel portion of the foot supporting part; and
a rearfoot plate coupled to the rear connecting part,
wherein the rear connecting part includes a joint, and
the joint allows movement of the rearfoot plate to make plane contact with the ground at a moment of a heel strike during a gait cycle,
wherein the foot supporting part is coupled to a rear moving member moving in a longitudinal direction of the foot supporting part, a position of the rear moving member is adjusted by a rear adjusting member, and the rear connecting part is coupled to the rear moving member.

2. The gait assistive device of claim 1, wherein the foot supporting part is coupled to a front supporting part at a front side of a foot.

3. The gait assistive device of claim 1, wherein the foot supporting part is coupled to a front connecting part at a front side of the foot supporting part, and a forefoot plate coupled to the front connecting part.

4. The gait assistive device of claim 3, wherein the foot supporting part is coupled to a front moving member moving in the shaft direction, a position of the front moving member is adjusted by a front adjusting member, and the front connecting part is coupled to the front moving member.

5. The gait assistive device of claim 3, wherein the rearfoot plate and the forefoot plate are coupled to a plate connecting part that transmits interlocking movement therebetween, respectively.

6. The gait assistive device of claim 3, wherein the front connecting part includes a joint, and the joint is disposed between a load line formed at a heel off and a load line formed at a toe off, during a gait cycle based on a gait proceeding direction.

7. The gait assistive device of claim 1, wherein the joint has a structure that allows the rearfoot plate to move in a coronal or sagittal plane, or simultaneously allows the rearfoot plate to move in the coronal and sagittal planes.

8. A walking robot comprising the gait assistive device according to claim 1.

* * * * *